United States Patent
Panov

(10) Patent No.: US 11,655,769 B2
(45) Date of Patent: May 23, 2023

(54) CONTROLLER AND METHOD FOR CONTROLLING A GAS TURBINE

(71) Applicant: Siemens Energy Global GmbH & Co. KG, Munich (DE)

(72) Inventor: Vili Panov, Lincoln (GB)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 162 days.

(21) Appl. No.: 16/968,585

(22) PCT Filed: Feb. 13, 2019

(86) PCT No.: PCT/EP2019/053575
§ 371 (c)(1),
(2) Date: Aug. 8, 2020

(87) PCT Pub. No.: WO2019/162167
PCT Pub. Date: Aug. 29, 2019

(65) Prior Publication Data
US 2021/0040900 A1     Feb. 11, 2021

(30) Foreign Application Priority Data
Feb. 23, 2018   (EP) .................... 18158436

(51) Int. Cl.
F02C 9/28      (2006.01)
F02C 9/34      (2006.01)
F02C 9/50      (2006.01)
(52) U.S. Cl.
CPC .................. F02C 9/28 (2013.01); F02C 9/34 (2013.01); F02C 9/50 (2013.01)

(58) Field of Classification Search
CPC ...... F02C 9/28; F02C 9/34; F02C 9/50; F05D 2270/31; F23R 3/343
See application file for complete search history.

(56) References Cited

U.S. PATENT DOCUMENTS

| 5,896,736 A | 4/1999 | Rajamani |
|---|---|---|
| 6,095,793 A | 8/2000 | Greeb |

(Continued)

FOREIGN PATENT DOCUMENTS

| CN | 106460678 A | 2/2017 |
|---|---|---|
| CN | 107587944 A | 1/2018 |

(Continued)

OTHER PUBLICATIONS

PCT International Search Report and Written Opinion of International Searching Authority dated May 20, 2019 corresponding to PCT International Application No. PCT/EP2019/053575 filed Feb. 13, 2019.

*Primary Examiner* — Scott J Walthour

(57) ABSTRACT

A controller for a gas turbine wherein the gas turbine includes the compressor arranged to operate at a rotational speed n, the combustor and the fuel supply includes the first fuel supply and the second fuel supply, wherein the compressor is arranged to provide air to the combustor at a steady state air mass flow rate $m_{ss}$ and wherein the fuel supply is arranged to supply fuel at a fuel mass flow rate $m_{total}$ to the combustor. The controller is arranged to, responsive to the load change $\Delta L$ to the load L, control the fuel supply to supply a proportion Z of the fuel mass flow rate $m_{total}$ as a fuel mass flow rate $m_{fuel\ pilot}$ via the first fuel supply based, at least in part, on a combustor mass flow rate $m_r$.

14 Claims, 10 Drawing Sheets

(56) References Cited

U.S. PATENT DOCUMENTS

| | | |
|---|---|---|
| 9,822,710 B2 | 11/2017 | Brickwood et al. |
| 2004/0216462 A1 | 11/2004 | Hellat et al. |
| 2007/0079593 A1 | 4/2007 | Fujii et al. |
| 2012/0196234 A1* | 8/2012 | Bulat .................. F23N 5/16 431/13 |
| 2014/0026587 A1 | 1/2014 | Zhang |
| 2014/0277789 A1 | 9/2014 | Stuttaford et al. |
| 2018/0216487 A1* | 8/2018 | Michel .................. F01D 25/18 |

FOREIGN PATENT DOCUMENTS

| | | |
|---|---|---|
| EP | 2104802 B1 | 8/2011 |
| JP | H07189746 A | 7/1995 |
| RU | 2258149 C1 | 8/2005 |
| WO | 2008087126 A1 | 7/2008 |
| WO | 2015185413 A1 | 12/2015 |
| WO | 2016174175 A1 | 11/2016 |

* cited by examiner

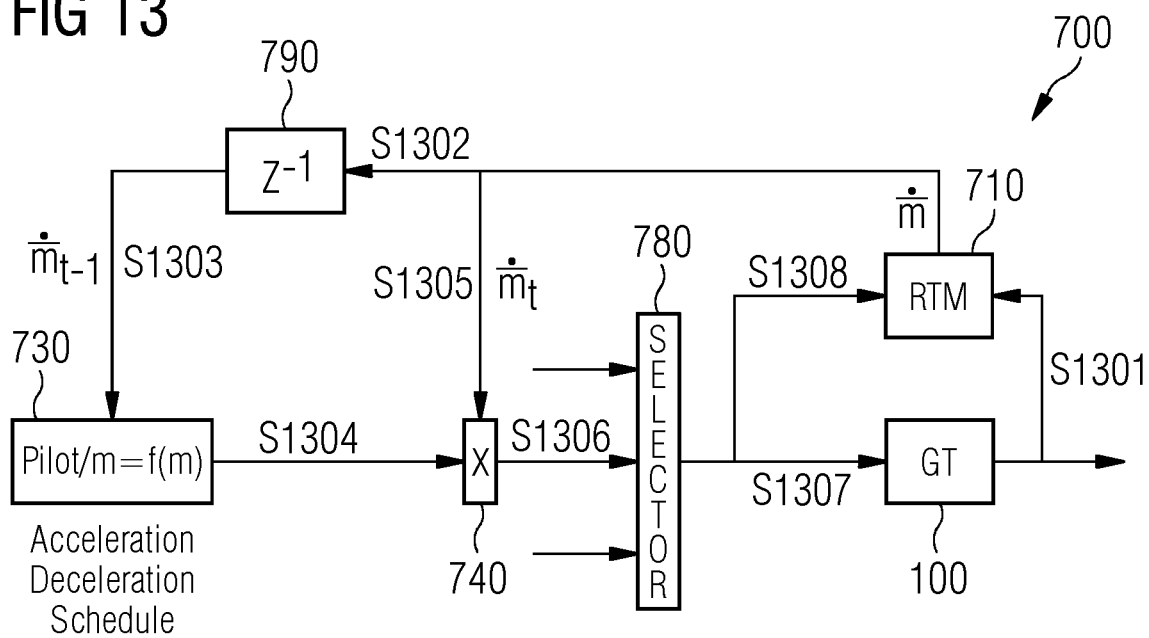
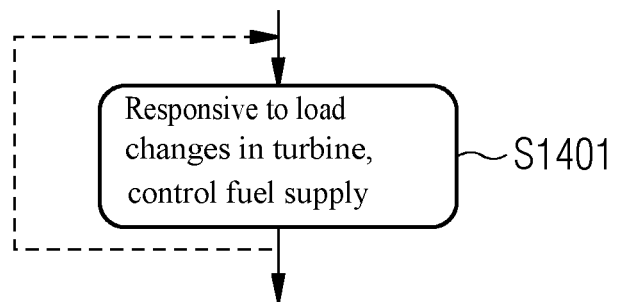

CONTROLLER AND METHOD FOR CONTROLLING A GAS TURBINE

CROSS REFERENCE TO RELATED APPLICATIONS

This application is the US National Stage of International Application No. PCT/EP2019/053575 filed 13 Feb. 2019, and claims the benefit thereof. The International Application claims the benefit of European Application No. EP18158436 filed 23 Feb. 2018. All of the applications are incorporated by reference herein in their entirety.

FIELD OF INVENTION

The present invention relates generally to controllers for gas turbines, to gas turbines comprising such controllers and to methods of controlling such gas turbines.

BACKGROUND

Conventional controllers for gas turbines implement relatively conservative control methods such that the gas turbines are operated at relatively higher safety margins. These conservative control methods impose restrictions on transient events, such as load acceptance and load rejection, such that only relatively small loads may be accepted or rejected.

WO 2015185413 A1 describes a method for determining a fuel split setting value utilisable for adjusting a fuel split setting for a combustion device, the fuel split setting defining a relation between main fuel and pilot fuel.

EP2104802 B1 describes a method of controlling a fuel split of a pilot fuel flow and a main fuel flow in a gas turbine combustor in case of load reductions characterised in that the rate of change of fuel demand is monitored and an additional pilot fuel flow is added the amount of which depends on the rate of the change in fuel flow demand.

U.S. Pat. No. 9,822,710 B2 describes a combustion device control unit and a combustion device, e.g. a gas turbine, which determine on the basis of at least one operating parameter whether the combustion device is in a predefined operating stage. In response hereto, there is generated a control signal configured for setting a ratio of at least two different input fuel flows to a predetermined value for a predetermined time in case the combustion device is in the predefined operating stage.

U.S. Pat. No. 6,095,793A discloses a unique and useful dynamic control system for the control of a catalytic combustion system for use on a dynamic plant, preferably, a gas turbine engine. The dynamic control system facilitates the replacement of conventional flame combustion systems with catalytic combustion systems, which produce far less pollutants, by producing acceptable transient performance of the combustion system. A method of controlling the catalytic combustion process comprises the steps of calculating a mass flow of air introduced into the combustor, monitoring a flow of fuel to be combusted within the combustor, monitoring a temperature of the air introduced into the combustor, calculating an inlet temperature set point based on the mass flow and fuel flow, and controlling a pre-burner to heat the air based on the inlet temperature set point, the mass flow, and the temperature of the air. Further, the mass flow may be estimated based on ambient air temperature and pressure, and compressor speed. A catalytic combustion gas turbine system is also presented, the operation of which is controlled by a dynamic plant controller which generates a fuel flow rate demand signal to control the flow of fuel to be combusted in response to dynamic plant demands.

U.S. Pat. No. 5,896,736A discloses a rapid acting control system for a gas turbine in an electrical system that is adapted to control fuel and air supply to the turbine to prevent flameout condition in the turbine and includes: a turbine control unit having an air supply controller that controls the position of a plurality of turbine inlet guide vanes (IGVs) in correspondence with at least one turbine condition signal; a load rejection module coupled to the air supplier controller and to a turbine electrical load sensor so as to generate a transient IGV correction signal in correspondence with a sensed turbine electrical load drop condition. A method of operating a gas turbine to maintain the turbine on-line during a loss of load condition includes the steps of sensing a loss of load condition for the turbine; supplying an inlet guide vane correction signal into an air supply controller coupled to control the position of a plurality of turbine IGVs, the IGV correction signal being independent of other turbine operating condition signals applied to the air supply controller; and adjusting the position of the plurality of IGVs in response to the IGV correction signal to adjust the turbine fuel air mixture in the gas turbine to prevent flameout during a loss of electrical load condition. The method typically further includes the step of removing the IGV correction signal after a correction time delay.

US 2004/216,462 A1 discloses a gas turbo group having a combustion chamber comprising a catalytic burner stage, a pre-burner stage located upstream from the catalytic burner stage, as well as a non-catalytic burner stage located downstream from the catalytic burner stage. The pre-burner stage serves to always maintain a temperature at the inlet into the catalytic stage that corresponds at least to a minimum temperature necessary for operating the catalytic burner stage. According to the invention, the gas turbo group is operated so that the burner stage located downstream from the catalytic combustion chamber is taken into operation only when the temperature at the outlet from the catalytic stage has reached an upper limit in the presence of a maximum combustion air mass flow.

US 2014/026,587 A1 discloses a method and system for transient operating of a gas turbine. Operation of the gas turbine the controller determines command values for an inlet air mass flow, fuel mass flow, and for a water or steam mass flow. In order to allow fast transient operation with a stable premix flame at least one command value is dynamically compensated to compensate for the different system dynamics of the supply systems to synchronize the resulting changes in fuel, water, steam, and/or combustion air mass flows, which reach the combustor, so that the fuel to air ratio stays within the combustible limit.

Hence, there is a need to improve control of gas turbines, for example control related to transient events, such as load acceptance and load rejection.

SUMMARY

According to the present disclosure there is provided a method of controlling a gas turbine, a controller for a gas turbine, a gas turbine comprising such a controller and a tangible non-transient computer-readable storage medium as set forth in the appended claims. Other features of the invention will be apparent from the dependent claims, and the description which follows.

According to a first aspect, there is provided a method of controlling a gas turbine arranged to supply a load L, the gas turbine comprising a compressor arranged to operate at a rotational speed $\bar{n}$, a combustor and a fuel supply means comprising a first fuel supply means and a second fuel supply means, wherein the compressor is arranged to provide air to the combustor at a steady state air mass flow rate $\bar{m}_{SS}$ and wherein the fuel supply means is arranged to supply fuel at a fuel mass flow rate $m_{total}$ to the combustor, the method comprising:

responsive to a load change ΔL to the load L, controlling the compressor to provide air to the combustor at a new air mass flow rate $\bar{m}_{TR}$, wherein the new air mass flow rate $\bar{m}_{TR}$ is within a range between a first threshold $\bar{m}_{LEO}$ and a second threshold $\bar{m}_{SUR}$.

In this way, the control of the gas turbine is better adapted for transient events, such as load acceptance and/or load rejection. In this way, the gas turbine may be better controlled to increase power output, for example more quickly and/or more accurately, during load acceptance, thereby enabling increased loads to be accepted without stalling the gas turbine, for example. In this way, the gas turbine may be better controlled to decrease power output, for example more quickly and/or more accurately, during load rejection, thereby enabling increased loads to be rejected without over-speeding, which may cause over-frequency of electrical generators, for example.

In one example, the method is a closed control loop method.

This method comprises an adaptive closed-loop transient scheduling of total fuel demand to control acceleration and/or deceleration of the compressor based on model-based control parameter(s) such as compressor air mass flow and predetermined operational limits like compressor surge and combustor Lean Blow Out Limit. This contributes to more robust gas turbine engine operation during transient events such as load acceptance and load rejection.

It should be understood that the rotational speed is a non-dimensional rotational speed $\bar{n}$ given by:

$$\bar{n} = \frac{\bar{n}_{actual}}{\sqrt{T}}$$

where $\bar{n}_{actual}$ is the actual rotational speed of the compressor and T is the absolute temperature of the air at the compressor inlet.

It should be understood that air mass flow rates $\bar{m}$, for example the steady state air mass flow rate $\bar{m}_{SS}$ and the new air mass flow rate $\bar{m}_{TR}$, are non-dimensional air mass flow rates given generally by:

$$\dot{\bar{m}} = \dot{m} \times \frac{\sqrt{T}}{P}$$

where $\dot{m}$ is the actual air mass flow rate, T is the absolute temperature of the air and P is the pressure of the air at the compressor inlet.

In one example, the first threshold $\bar{m}_{LBO}$ is a lean blow out (LBO) limit, corresponding with loss of a burner flame. In one example, the second threshold $\bar{m}_{SUR}$ is the surge limit, corresponding with surge of the compressor. In one example, the first threshold $\bar{m}_{LBO}$ and/or the second threshold $\bar{m}_{SUR}$ is measured, for example, from the gas turbine. In one example, the first threshold $\bar{m}_{LBO}$ and/or the second threshold $\bar{m}_{SUR}$ is included in a real-time model of the gas turbine. In this way, the gas turbine may be controlled to operate closer to the first threshold $\bar{m}_{LBO}$ and/or the second threshold $\bar{m}_{SUR}$.

In one example, controlling the compressor to provide air to the combustor at the new air mass flow rate $\bar{m}_{TR}$ comprises determining a correction factor CF for the load change ΔL RAO to the load L and adjusting the air mass flow rate $\bar{m}$ to the new air mass flow rate $\bar{m}_{TR}$ based, at least in part, on the determined correction factor CF. In this way, the gas turbine may be controlled pre-emptively and/or reactively to transient events.

In one example, determining the correction factor C comprises calculating the correction factor CI according to:

$$CF = \frac{\dot{\bar{m}}_{TR} - \dot{\bar{m}}_{SUR}}{\dot{\bar{m}}_{SS} - \dot{\bar{m}}_{SUR}}$$

if the load change ΔL to the load L is positive.

In one example, determining the correction factor CF comprises calculating the correction factor CF according to:

$$CF = \frac{\dot{\bar{m}}_{TR} - \dot{\bar{m}}_{SUR}}{\dot{\bar{m}}_{SS} - \dot{\bar{m}}_{SUR}}$$

if $\bar{m}_{TR} > (\bar{m}_{SS} + \ddot{A}\bar{m}_{HIGH})$, wherein $\ddot{A}\bar{m}_{HIGH}$ is within a range between the steady state air mass flow rate $\bar{m}_{SS}$ and the second threshold $\bar{m}_{SUR}$.

In one example, determining the correction factor CF comprises calculating the correction factor CF according to:

$$CF = \frac{\dot{\bar{m}}_{LBO} - \dot{\bar{m}}_{TR}}{\dot{\bar{m}}_{LBO} - \dot{\bar{m}}_{SS}}$$

if the load change ΔL to the load L is negative.

In one example, determining the correction factor CF comprises calculating the correction factor CF according to:

$$CF = \frac{\dot{\bar{m}}_{LBO} - \dot{\bar{m}}_{TR}}{\dot{\bar{m}}_{LBO} - \dot{\bar{m}}_{SS}}$$

$\bar{m}_{TR} < (\bar{m}_{SS} - \ddot{A}\bar{m}_{LOW})$, wherein $\hat{A}\hat{m}m_{LOW}$ is within a range between the steady state air mass flow rate $\bar{m}_{SS}$ and the first threshold $\bar{m}_{LBO}$.

In one example, controlling air provided to the combustor at the new air mass flow rate $\bar{m}_{TR}$ comprises determining a rate of change of the rotational speed dn/dt corresponding to the load change ΔL to the load L and adjusting the air mass flow rate $\bar{m}_{SS}$ to the new air mass flow rate $\bar{m}_{TR}$ based, at least in part, on the determined correction factor CF and the determined rate of change of the rotational speed dn/dt.

In one example, controlling air provided to the combustor at the new air mass flow rate $\bar{m}_{TR}$ comprises adjusting the steady state air mass flow rate $\bar{m}_{SS}$ to the new air mass flow rate $\bar{m}_{TR}$ based, at least in part, on a product of the determined correction factor CE and the determined rate of change of the rotational speed dn/dt.

In one example, controlling air provided to the combustor at the new air mass flow rate $\bar{m}_{TR}$ comprises adjusting the steady state air mass flow rate $\bar{m}_{SS}$ to the new air mass flow rate $\bar{\mathrm{m}}_{TR}$ based on a sum of the determined rate of change of the rotational speed dn/dt and the product of the determined correction factor CF and the determined rate of change of the rotational speed dn/dt.

In one example, the method comprises: responsive to the load change ΔL to the load L, controlling the fuel supply means to supply a proportion Z of the fuel mass flow rate $m_{total}$ as a fuel mass flow rate $\dot{m}_{fuel\_pilot}$ via the first fuel supply means based, at least in part, on a combustor mass flow rate $\dot{m}_T$.

In one example, controlling the proportion Z of the fuel mass flow rate $m_{total}$ as the fuel mass flow rate $\dot{m}_{fuel\_pilot}$ supplied via the first fuel supply means is based, at least in part, on a previous combustor mass flow rate $\dot{m}_{T-1}$ supplied via the first fuel supply means in a previous time step T-1.

In one example, controlling the proportion Z of the fuel mass flow rate $m_{total}$ as the fuel mass flow rate $\dot{m}_{fuel\_pilot}$ supplied via the first fuel supply means is based, at least in part, on the previous combustor mass flow rate $\dot{m}_{T-1}$ supplied via the first fuel supply means in the previous time step T-1 wherein the previous combustor mass flow rate $\dot{m}_{T-1}$ is provided from a set thereof. In one example, the set is measured, for example, from the gas turbine. In one example, set is included in a real-time model of the gas turbine. In this way, the gas turbine may be controlled to operate closer to the set.

According to a second aspect, there is provided a controller for a gas turbine, the gas turbine comprising a compressor arranged to operate at a rotational speed $\bar{n}$, a combustor and a fuel supply means comprising a first fuel supply means and a second fuel supply means, wherein the compressor is arranged to provide air to the combustor at a steady state air mass flow rate $\bar{m}_{SS}$ and wherein the fuel supply means is arranged to supply fuel at a fuel mass flow rate to the combustor, wherein the controller is arranged to: responsive to a load change ΔL to the load L, control the compressor to provide air to the combustor at a new air mass flow rate $\bar{m}_{TR}$, wherein the new air mass flow rate $\bar{m}_{TR}$ is within a range between a first threshold $\bar{m}_{LBO}$ and a second threshold $\bar{m}_{SUR}$.

According to a third aspect, there is provided a method of controlling a gas turbine arranged to supply a load L, the gas turbine comprising a compressor arranged to operate at a rotational speed $\bar{n}$, a combustor and a fuel supply means comprising a first fuel supply means and a second fuel supply means, wherein the compressor is arranged to provide air to the combustor at a steady state air mass flow rate $\bar{m}_{SS}$ and wherein the fuel supply means is arranged to supply fuel at a fuel mass flow rate $m_{total}$ to the combustor, the method comprising: responsive to the load change ΔL to the load L, controlling the fuel supply means to supply a proportion Z of the fuel mass flow rate $m_{total}$ as a fuel mass flow rate $\dot{m}_{fuel\_pilot}$ via the first fuel supply means based, at least in part, on a combustor mass flow rate $\dot{m}_t$.

The combustor mass flow rate $\dot{m}_t$ is a sum of the air mass flow rate $\bar{m}$ and the fuel mass flow rate $m_{total}$.

In this way, the control of the gas turbine is better adapted for transient events, such as load acceptance and/or load rejection. In this way, the gas turbine may be better controlled to increase power output, for example more quickly and/or more accurately, during load acceptance, thereby enabling increased loads to be accepted without loss of a pilot flame of the combustor, for example. In this way, the gas turbine may be better controlled to decrease power output, for example more quickly and/or more accurately, during load rejection, thereby enabling increased loads to be rejected without overheating of a burner of the combustor. In this way, control of the gas turbine is better adapted for transient events, reducing likelihood of trips, faults, damage and/or deterioration.

In one example, the method is a closed control loop method.

In one example, controlling the proportion Z of the fuel mass flow rate $m_{total}$ as the fuel mass flow rate $\dot{m}_{fuel\_pilot}$ supplied via the first fuel supply means is based, at least in part, on a previous combustor mass flow rate $\dot{m}_{t-1}$ supplied via the first fuel supply means and/or the compressor in a previous time step t-1. In this way, the gas turbine may be controlled based, at least in part, on previous operating conditions.

In one example, controlling the proportion Z of the fuel mass flow rate $m_{total}$ as the fuel mass flow rate $\dot{m}_{fuel\_pilot}$ supplied via the first fuel supply means is based, at least in part, on the previous combustor mass flow rate $\dot{m}_{T-1}$ supplied via the first fuel supply means and/or the compressor in the previous time step t-1, wherein the previous combustor mass flow rate $\dot{m}_{t-1}$ is provided from a set thereof.

In one example, the proportion Z of the fuel mass flow rate $m_{total}$ as the fuel mass flow rate $\dot{m}_{fuel\_pilot}$ supplied via the first fuel supply means is within a range between a first pilot threshold $\dot{m}_{LBO}$ and a second pilot threshold $\dot{m}_{TT}$.

In one example, the first pilot threshold $\dot{m}_{LBO}$ corresponds with loss of a pilot flame of the combustor.

In one example, the second pilot threshold $\dot{m}_{TT}$ corresponds with overheating of a burner of the combustor.

In one example, the first pilot threshold $\dot{m}_{LBO}$ is predetermined for the gas turbine.

In one example, the second pilot threshold $\dot{m}_{TT}$ is predetermined for the gas turbine.

In one example, the proportion Z of the fuel mass flow rate $m_{total}$ as the fuel mass flow rate $\dot{m}_{fuel\_pilot}$ supplied via the first fuel supply means is below the first pilot threshold $\dot{m}_{LBO}$ for at most a predetermined first duration.

In one example, the proportion Z of the fuel mass flow rate $m_{total}$ as the fuel mass flow rate $\dot{m}_{fuel\_pilot}$ supplied via the first fuel supply means is above the second pilot threshold $\dot{m}_{TT}$ for at most a predetermined second duration.

In one example, controlling the proportion Z of the fuel mass flow rate $m_{total}$ as the fuel mass flow rate $\dot{m}_{fuel\_pilot}$ supplied via the first fuel supply means comprises decreasing the proportion Z if the load change ΔL to the load L is positive.

In one example, controlling the proportion Z of the fuel mass flow rate $m_{total}$ as the fuel mass flow rate $\dot{m}_{fuel\_pilot}$ supplied via the first fuel supply means comprises increasing the proportion Z if the load change ΔL to the load L is negative.

According to a fourth aspect, there is provided controller for a gas turbine, the gas turbine comprising a compressor arranged to operate at a rotational speed $\bar{n}$, a combustor and a fuel supply means comprising a first fuel supply means and a second fuel supply means, wherein the compressor is arranged to provide air to the combustor at a steady state air mass flow rate $\bar{m}_{SS}$ and wherein the fuel supply means is arranged to supply fuel at a fuel mass flow rate $m_{total}$ to the combustor, wherein the controller is arranged to: responsive to a load change ΔL to the load L, control the fuel supply means to supply a proportion 2 of the fuel mass flow rate $m_{total}$ as a fuel mass flow rate $\dot{m}_{fuel\_pilot}$ via the first fuel supply means based, at least in part, on a combustor mass flow rate $\dot{m}_t$.

According to a fifth aspect, there is provided a gas turbine comprising a compressor arranged to operate at a rotational speed $\bar{n}$, a combustor and a fuel supply means comprising a first fuel supply means and a second fuel supply means, wherein the compressor is arranged to provide air to the combustor at a steady state air mass flow rate $\bar{m}_{SS}$ and wherein the fuel supply means is arranged to supply fuel at a fuel mass flow rate $m_{total}$ to the combustor, wherein the gas turbine comprises a controller according to the second aspect and/or the fourth aspect.

According to a sixth aspect, there is provided a tangible non-transient computer-readable storage medium is provided having recorded thereon instructions which when implemented by a controller for a gas turbine, the gas turbine comprising a compressor arranged to operate at a rotational speed $\bar{n}$, a combustor and a fuel supply means comprising a first fuel supply means and a second fuel supply means, wherein the compressor is arranged to provide air to the combustor at a steady state air mass flow rate $\bar{m}_{SS}$ and wherein the fuel supply means is arranged to supply fuel at a fuel mass flow rate $m_{total}$ to the combustor, cause the controller to perform a method of controlling the gas turbine, the method according to the first aspect and/or the third aspect.

BRIEF DESCRIPTION OF THE DRAWINGS

Examples of the present disclosure will now be described with reference to the accompanying drawings, in which:

FIG. 13 shows a schematic view of a controller according to an exemplary embodiment;

FIG. 14 shows a schematic view of a method of controlling a gas turbine according to an exemplary embodiment;

DETAILED DESCRIPTION

Figure 1:
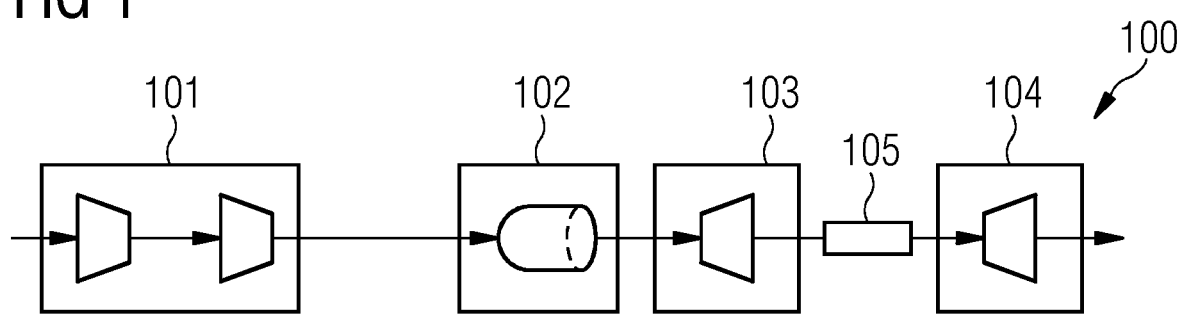
FIG. 1 shows a schematic view of a gas turbine of a type that may be used according to an exemplary embodiment.

FIG. 1 shows a schematic view of a gas turbine 100 of a type that may be used according to an exemplary embodiment. The gas turbine 100 comprises a compressor 101, a combustor 102, a compressor turbine 103, a power turbine 104, and an interduct 105.

The gas turbine 100 comprises a gas generator device which is adapted for generating pressurized working fluid. The gas generator device comprises the compressor 101, the combustor 102 and the compressor turbine 103. A working fluid, such as air, is injected into the compressor 101. The compressor 101 pressurizes the working fluid.

The arrows in FIG. 1 show the flow direction of the working fluid. Downstream of the compressor 101, fuel is injected into the combustor 102. The working fluid, i.e. a part of the working fluid, is mixed with the fuel and is burned. The combustor 102 generates pressurized, high energized working fluid which drives the compressor turbine 103 such that mechanical energy is generated for driving the compressor 101, respectively.

The hot pressurized, high energized working fluid is guided through an interduct 105 to the power turbine 104. The pressurized hot working fluid drives the power turbine 104 for generating torque.

Figure 2:
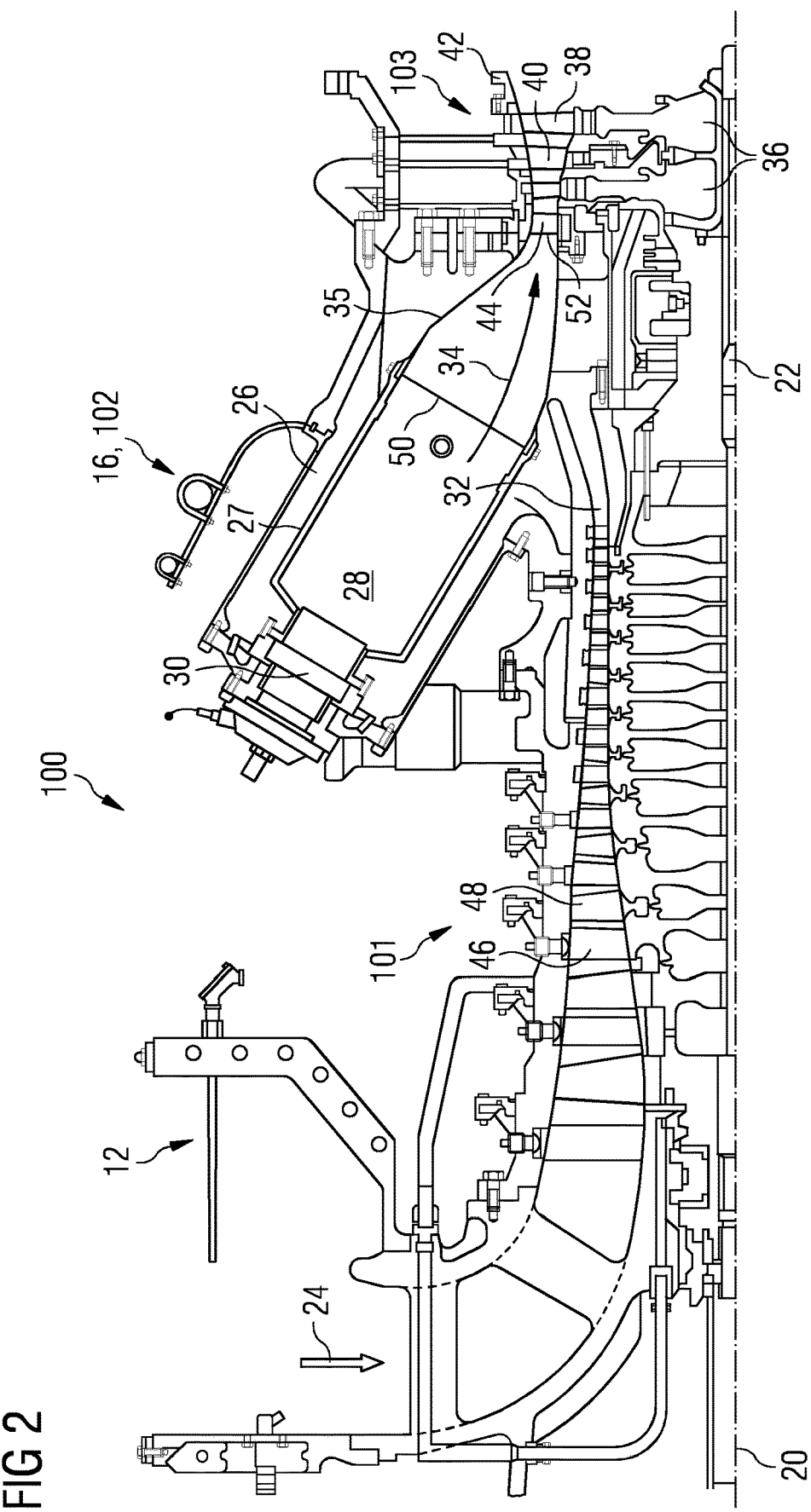
FIG. 2 shows a schematic view of the gas turbine of FIG. 1, in more detail.

FIG. 2 shows a schematic view of the gas turbine 100 of FIG. 1, in more detail. Particularly, FIG. 2 shows schematically the compressor 101, the combustor 102 and the compressor turbine 103 of the gas turbine 100 as shown in FIG. 1 in more detail.

The terms upstream and downstream refer to the flow direction of the airflow and/or working gas flow through the engine unless otherwise stated. The terms forward and rearward refer to the general flow of gas through the engine. The terms axial, radial and circumferential are made with reference to a rotational axis 20 of the engine.

The gas turbine 100 comprises, in flow series, an inlet 12, the compressor 101, the combustor 102 and the compressor turbine 103 which are generally arranged in flow series and generally in the direction of a longitudinal or rotational axis 20. The gas turbine 100 further comprises a shaft 22 which is rotatable about the rotational axis 20 and which extends longitudinally through the gas turbine 100. The shaft 22 drivingly connects the compressor turbine 103 to the compressor 101.

In operation of the gas turbine 100, air 24, which is taken in through the air inlet 12 is compressed by the compressor 101 and delivered to the combustor 102 comprising a burner section 16. The burner section 16 comprises a burner plenum 26, one or more combustion chambers 28 defined by a double wall can 27 and at least one burner 30 fixed to each combustion chamber 28. The combustion chambers 28 and the burners 30 are located inside the burner plenum 26. The compressed air passing through the compressor 101 enters a diffuser 32 and is discharged from the diffuser 32 into the burner plenum 26 from where a portion of the air enters the burner 30 and is mixed with a gaseous or liquid fuel. The air/fuel mixture is then burned and the combustion gas 34 or working gas from the combustion is channeled via a transition duct 35 to the compressor turbine 103.

The compressor turbine 103 comprises a number of blade carrying discs 36 attached to the shaft 22. In the present example, two discs 36 each carry an annular array of turbine blades 38. However, the number of blade carrying discs could be different, i.e. only one disc or more than two discs. In addition, guiding vanes 40, which are fixed to a stator 42 of the gas turbine 100, are disposed between the turbine blades 38. Between the exit of the combustion chamber 28 and the leading turbine blades 38 inlet guiding vanes 44 are provided.

The combustion gas from the combustion chamber 28 enters the compressor turbine 103 and drives the turbine blades 38 which in turn rotates the shaft 22. The guiding vanes 40, 44 serve to optimise the angle of the combustion or working gas on to the turbine blades 38. The compressor 101 comprises an axial series of guide vane stages 46 and rotor blade stages 48.

Figure 3:
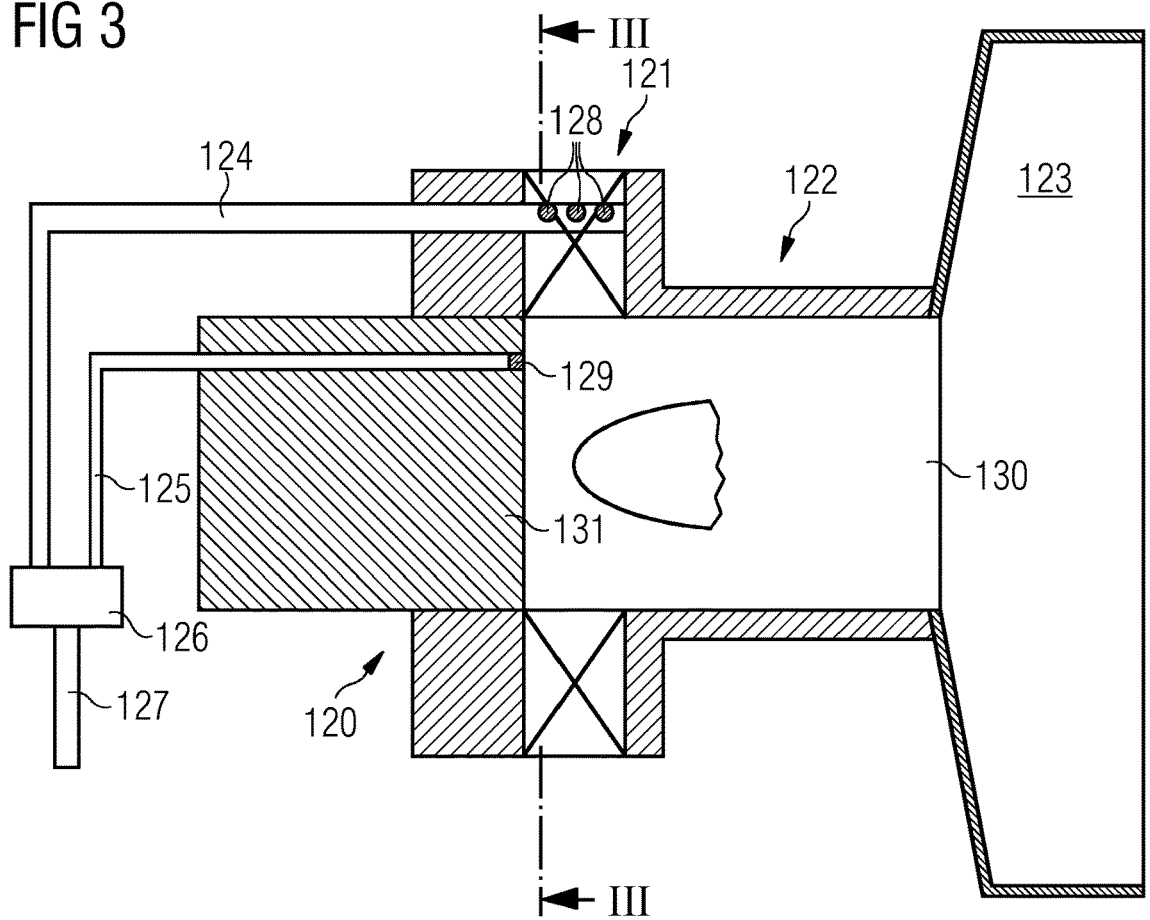
FIG. 3 shows a schematic view of the gas turbine of FIG. 1, in more detail.

FIG. 3 shows a schematic view of the gas turbine of FIG. 1, in more detail. Particularly, FIG. 3 shows a part of the combustion chamber 28, in more detail.

Figure 4:
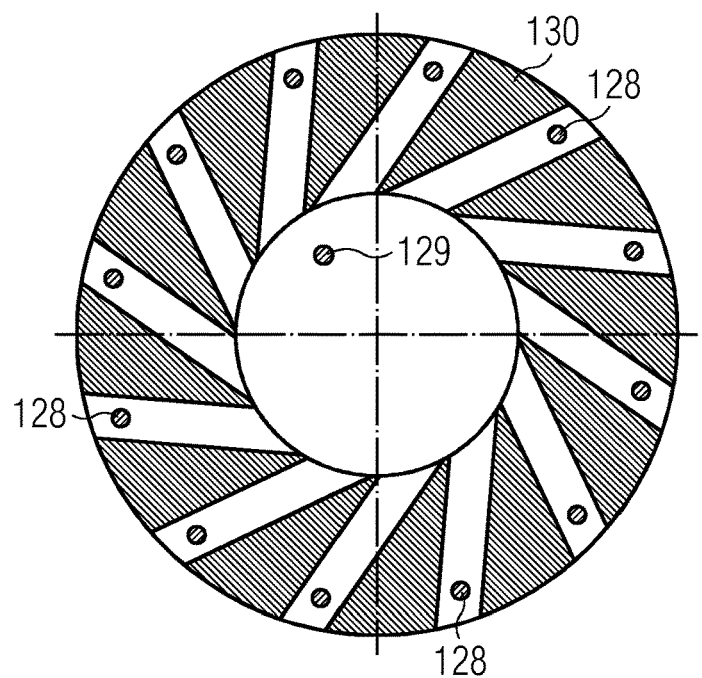
FIG. 4 shows a schematic view of the gas turbine of FIG. 1, in more detail.

FIG. 4 shows a schematic view of the gas turbine of FIG. 1, in more detail. Particularly, FIG. 4 shows a section of the combustion chamber 28 along a line shown in FIG. 3.

The combustion chamber 28 is in four parts: a front-end part 120, a swirler part 121, a burner pre-chamber part 122 and a combustion volume 123. Main fuel is introduced into the swirler 121 by way of the front-end part 120 through a conduit 124, while pilot fuel enters the burner space through a conduit 125 having at its end a pilot-fuel nozzle 129. The main and pilot fuel-flows are derived from a fuel-split valve 126, which is fed with a fuel supply means 127 representing the total fuel supply to the combustion chamber 123. The fuel supply means 127 comprises thus a main or first fuel supply means and a pilot or second fuel supply means. The main fuel flow enters the swirler 121 through a set of main-fuel nozzles (or injector) 128, from where it is guided along swirler vanes 130, being mixed with incoming compressed air in the process. The fuel may be gaseous fuel or liquid fuel. The resulting air/fuel mixture maintains a burner flame 30. The hot air from this burner flame 30 enters the combustion volume 123. A gas turbine will often comprise a number of such combustion chambers 28, in which case the main and pilot fuel-flow distribution will usually be as shown in FIG. 5.

Figure 5:
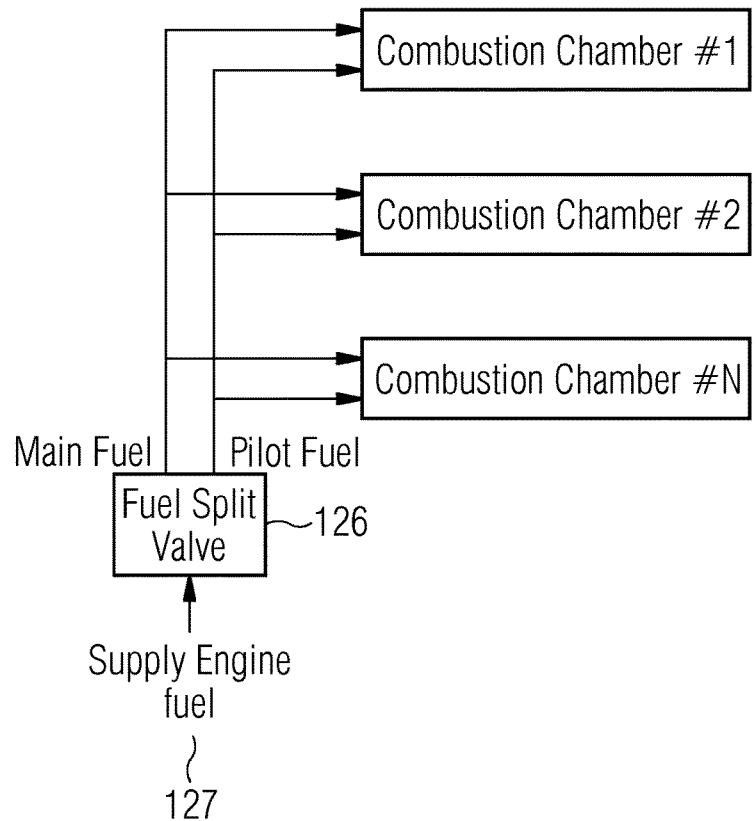
FIG. 5 shows a schematic view of the gas turbine of FIG. 1, in more detail.

FIG. 5 shows a schematic view of the gas turbine of FIG. 1, in more detail. Particularly, FIG. 5 shows the main and pilot fuel-flow distribution for 1, 2, . . . N combustion chambers 28. The main and pilot fuel-flows are derived from the fuel-split valve 126, which is fed with the fuel supply means 127 representing the total fuel supply to the 1, 2, . . . N combustion chambers 28. The fuel supply means 127 comprises thus the main or first fuel supply means and the pilot or second fuel supply means.

Figure 6:
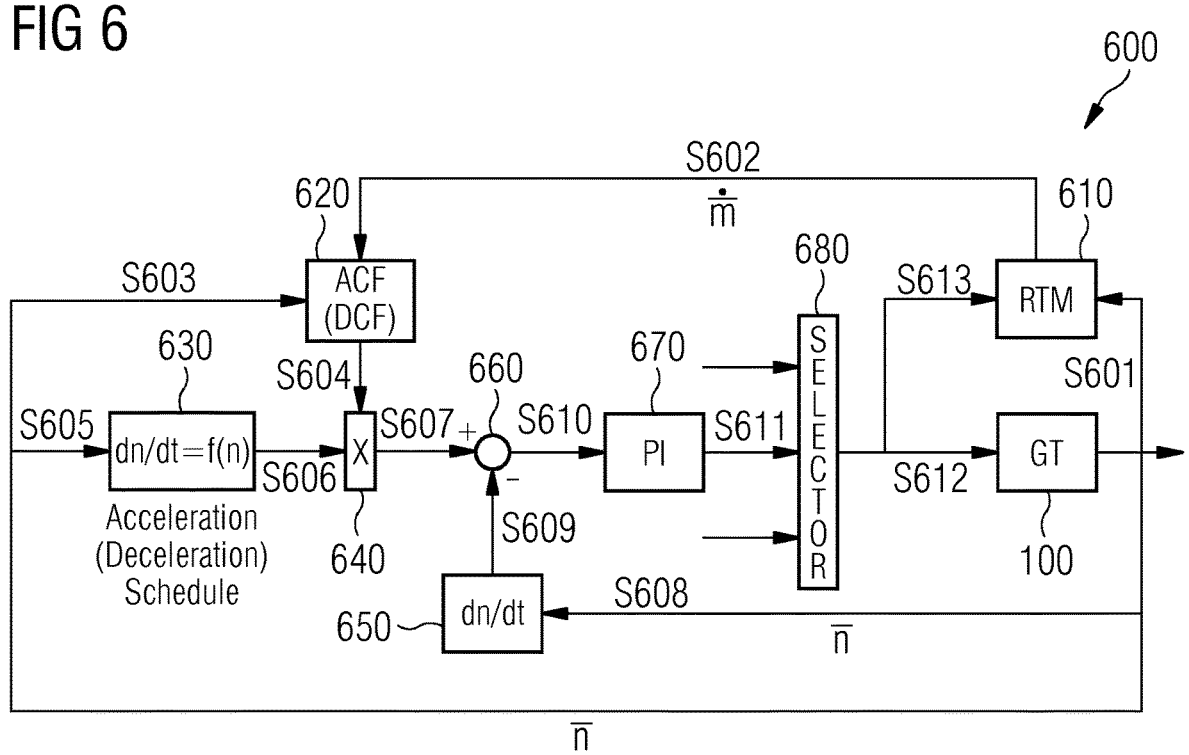
FIG. 6 shows a schematic view of a controller according to an exemplary embodiment.

FIG. 6 shows a schematic view of a controller 600 according to an exemplary embodiment. Particularly, FIG. 6 shows a schematic view of the controller 600 communicatively coupled to the gas turbine 100.

The controller 600 is for the gas turbine 100. The gas turbine 100 comprises the compressor 101 arranged to operate at a rotational speed $\bar{n}$, the combustor 102 and the fuel supply means 127 comprising the first fuel supply means and the second fuel supply means, wherein the compressor 101 is arranged to provide air to the combustor 102 at a steady state air mass flow rate $\bar{m}_{SS}$ and wherein the fuel supply means 127 is arranged to supply fuel at a fuel mass flow rate $m_{total}$ to the combustor 102. The controller 600 is arranged to, responsive to a load change $\Delta L$ to the load L, control the compressor 101 to provide air to the combustor 102 at a new air mass flow rate $\bar{m}_{TR}$, wherein the new air mass flow rate $\bar{m}_{TR}$ is within a range between a first threshold $\bar{m}_{LEO}$ and a second threshold $\bar{m}_{SUR}$.

In this example, the controller 600 comprises a real-time model unit 610, a correction factor determination unit 620, an acceleration/deceleration schedule unit 630, a multiplication unit 640, an acceleration/deceleration determination unit 650, a summation unit 660, a Proportional Integral (PI) controller unit 670 and a selector unit 680. Other arrangements are possible.

In one example, the real-time model unit 610 is arranged to determine an estimate of the new air mass flow rate $\bar{m}_{TR}$. In one example, the real-time model unit 610 is arranged to determine the estimate of the new air mass flow rate $\bar{m}_{TR}$ based, at least in part, on a real-time model of the gas turbine 100. In one example, the real-time model unit 610 is arranged to determine the estimate of the new air mass flow rate $\bar{m}_{TR}$ based, at least in part, on the rotational speed $\bar{n}$. In one example, the real-time model unit 610 is arranged to receive the rotational speed $\bar{n}$ from the gas turbine 100. In one example, the real-time model unit 610 is arranged to provide the determined estimate of the new air mass flow rate $\bar{m}_{TR}$ to the correction factor determination unit 620.

In one example, the real-time model unit 610 comprises a real-time (also known as a dynamic) model of the gas turbine 100 described mathematically by a set of nonlinear differential equations:

$$\dot{x}=f_x(x,h,u,v)$$

where the distributed aero-thermodynamic, mechanical and electrical processes are included in a state coordinate vector $\dot{x}$. For n state variables, n sets of the above equation may be written. Controls, u, operating conditions, v, and health parameters, are quantities which may be distinguished by measurement and/or manipulation.

Measurements (also known as sensed parameters) may be taken on various quantities in the gas turbine 100. These sensed parameters may be related to the states, inputs and parameters according to the general algebraic expression:

$$y=g_y(x,h,u,v)$$

Where, in general, vector v comprises measurable and non-measurable parameters. These above equations for the state coordinate vector k and the vector y may be general enough to provide a starting point to describe the gas turbine 100 with respect to control design and state estimation.

After an accurate model is developed for the generic baseline, this gas turbine model may be expanded to include data representing the deteriorated gas turbine 100 (i.e. following use of the gas turbine 100, for example following commissioning and/or extended use thereof). Deterioration effects may include efficiency changes, area changes, pressure drops, as well as flow changes and disturbances due to bleed effects, for example. Typically, the two quantities of capacity and efficiency may be used to model changes in operation of the gas turbine 100 resulting in decreased energy conversion efficiency or component flow characteristics.

In one example, the real-time model is as described in WO 2015/117791 and/or WO 2017/198528.

In one example, the controller 600 is arranged to, responsive to the load change $\Delta L$ to the load L, control the compressor 101 to provide air to the combustor 102 at the new air mass flow rate $\bar{m}_{TR}$ by determining a correction factor CF for the load change $\Delta L$ to the load L and adjusting the air mass flow rates $\bar{m}$ to the new air mass flow rate $\bar{m}_{TR}$ based, at least in part, on the determined correction factor CF. In one example, the correction factor CF comprises and/or is an acceleration correction factor ACF. In one example, the correction factor CF comprises and/or is a deceleration correction factor DCF.

In one example, the correction factor determination unit 620 is arranged to determine the correction factor CF for the load change $\Delta L$ to the load L. In one example, the correction factor determination unit 620 is arranged to determine the correction factor CF for the load change ΔL to the load L based, at least in part, on the determined estimate of the new air mass flow rate $\overline{\dot{m}}_{TR}$ provided by the real-time model unit 610. In one example, the correction factor determination unit 620 is arranged to determine the correction factor CF based, at least in part, on the rotational speed $\overline{n}$. In one example, the correction factor determination unit 620 is arranged to determine the correction factor CF as described with reference to FIGS. 8, 9 and 11. In one example, the correction factor determination unit 620 is arranged to receive the rotational speed $\overline{n}$ from the gas turbine 100. In one example, the correction factor determination unit 620 is arranged to provide the determined correction factor CF for the load change ΔL to the load L to the multiplication unit 640.

In one example, the correction factor determination unit 620 is arranged to determine the correction factor CF by calculating the correction factor CF according to:

$$CF = \frac{\dot{m}_{TR} - \dot{m}_{SUR}}{\dot{m}_{SS} - \dot{m}_{SUR}}$$

if the load change ΔL the load L is positive. This corresponds to acceleration scheduling during load acceptance i.e. the correction factor CF is an acceleration correction factor ACF.

Particularly, there are two special cases to consider if the load change ΔL to the load L is positive.

In the first special case, further acceleration is not possible:

CF=ACF=0 for $\overline{\dot{m}}_{TR}=\overline{\dot{m}}_{SUR}$–surge limit at $\overline{n}_K$ In the second special case, free acceleration is possible:

CF=ACF=1 for $\overline{\dot{m}}_{TR}=\overline{\dot{m}}_{SS}$–running point at $\overline{n}_K$ In one example, the correction factor determination unit 620 is arranged to determine the correction factor CF by calculating the correction factor CF according to:

$$CF = \frac{\dot{m}_{TR} - \dot{m}_{SUR}}{\dot{m}_{SS} - \dot{m}_{SUR}}$$

if $\overline{\dot{m}}_{TR} > (\overline{\dot{m}}_{SS} + \overline{\mathrm{Ä}\dot{m}}_{HIGH})$, wherein $\overline{\mathrm{Ä}\dot{m}}_{HIGH}$ is within a range between the steady state air mass flow rate $\overline{\dot{m}}_{SS}$ and the second threshold $\overline{\dot{m}}_{SUR}$.

In one example, the correction factor determination unit 620 is arranged to determine the correction factor CF by calculating the correction factor CF according to:

$$CF = \frac{\dot{m}_{LBO} - \dot{m}_{TR}}{\dot{m}_{LBO} - \dot{m}_{SS}}$$

if the load change ΔL to the load L is negative. This corresponds to deceleration scheduling during load rejection i.e. the correction factor CF is a deceleration correction factor DCF.

Particularly, there are two special cases to consider if the load change ΔL to the loads is negative.

In the first special case, further deceleration is not possible:

CF=DCF=0 for $\overline{\dot{m}}_{TR}=\overline{\dot{m}}_{LBO}$–LBO limit at $\overline{n}_g$ In the second special case, free deceleration is possible:

CF=DCF=1 for $\overline{\dot{m}}_{TR}=\overline{\dot{m}}_{SS}$–running point at $\overline{n}_K$ In one example, the correction factor determination unit 620 is arranged to determine the correction factor CF by calculating the correction factor CF according to:

$$CF = \frac{\dot{m}_{LBO} - \dot{m}_{TR}}{\dot{m}_{LBO} - \dot{m}_{SS}}$$

if $\overline{\dot{m}}_{TR} < (\overline{\dot{m}}_{SS} - \overline{\mathrm{Ä}\dot{m}}_{LOW})$, wherein $\overline{\mathrm{Ä}\dot{m}}_{LOW}$ is within a range between the steady state air mass flow rate $\overline{\dot{m}}_{SS}$ and the first threshold $\overline{\dot{m}}_{LBO}$.

In one example, the controller 600 is arranged to, responsive to the load change ΔL to the load L, control the compressor 101 to provide air to the combustor 102 at the new air mass flow rate $\overline{\dot{m}}_{TR}$ by determining a rate of change of the rotational speed dn/dt corresponding to the load change ΔL to the load L and adjusting the air mass flow rate $\overline{\dot{m}}_{SS}$ to the new air mass flow raters $\overline{\dot{m}}_{TR}$ based, at least in part, on the determined correction factor CF and the determined rate of change of the rotational speed dn/dt.

In one example, the acceleration/deceleration schedule unit 630 is arranged to determine the rate of change of the rotational speed dn/dt corresponding to the load change ΔL to the load L. In one example, the acceleration/deceleration schedule unit 630 is arranged to determine the rate of change of the rotational speed dn/dt corresponding to the load change ΔL to the load L as a function of the rotational speed $\overline{n}$, for example, as described below with reference to FIGS. 10 and/or 12. In one example, this rate of change comprises and/or is an estimated acceleration/deceleration demand of the compressor 101. In one example, the acceleration/deceleration schedule unit 630 is arranged to receive the rotational speed $\overline{n}$ from the gas turbine 100. In one example, the acceleration/deceleration schedule unit 630 is arranged provide the determined rate of change of the rotational speed dn/dt, for example as the estimated acceleration/deceleration demand of the compressor 101, to the multiplication unit 640.

In one example, the controller 600 is arranged to control the compressor 101 to provide air to the combustor 102 at the new air mass flow rate $\overline{\dot{m}}_{TR}$ by adjusting, for example limiting, the air mass flow rate to the new air mass flow rate $\overline{\dot{m}}_{TR}$ based, at least in part, on a product of the determined correction factor CF and the determined rate of change of the rotational speed dn/dt.

In one example, the multiplication unit 640 is arranged to multiply (i.e. calculate the product of) the determined correction factor CF provided by the correction factor determination unit 620 and the estimated acceleration/deceleration demand of the compressor 101 provided by the acceleration/deceleration schedule unit 630, thereby providing a corrected acceleration/deceleration demand of the compressor 101. In one example, the multiplication unit 640 is arranged to provide the product of the determined correction factor CIF and the determined rate of change of the rotational speed dn/dt to the summation unit 660.

In one example, the controller 600 is arranged to control the compressor 101 to provide air to the combustor 102 at the new fuel mass flow rate $\overline{\dot{m}}_{TR}$ by adjusting, for example limiting, the air mass flow rate to the new air mass flow rate $\overline{\dot{m}}_{TR}$ based on a sum of the determined rate of change of the rotational speed dn/dt and the product of the determined correction factor CF and the determined rate of change of the rotational speed dn/dt.

In one example, the acceleration/deceleration determination unit 650 is arranged to determine the rate of change of the rotational speed dn/dt corresponding to the load change ΔL to the load L based on the received rotational speed $\bar{n}$ (i.e. an actual value rather than an estimate, for example). In one example, the acceleration/deceleration determination unit 650 is arranged to receive the rotational speed $\bar{n}$ from the gas turbine 100. In one example, the acceleration/deceleration determination unit 650 is arranged to provide the determined rate of change of the rotational speed dn/dt to the summation unit 660.

In one example, the summation unit 660 is arranged to sum the determined rate of change of the rotational speed dn/dt provided by the acceleration/deceleration determination unit 650 and the product of the determined correction factor CF and the determined rate of change of the rotational speed dn/dt (i.e. the corrected acceleration/deceleration demand of the compressor 101) provided by the multiplication unit 640, thereby providing an acceleration/deceleration error of the compressor 101 as a difference between the corrected acceleration/deceleration demand and the actual value provided by the acceleration/deceleration determination unit 650. In one example, the summation unit 660 is arranged to provide this sum (i.e. the acceleration/deceleration error of the compressor 101) to the PI controller 670.

In one example, the controller 600 is arranged to, responsive to the load change ΔL to the load L, control the compressor 101 to provide air to the combustor 102 at the new air mass flow rate $\bar{m}_{TR}$ determined from the sum of the determined rate of change of the rotational speed dn/dt and the product of the determined correction factor CF and the determined rate of change of the rotational speed dn/dt.

In one example, the controller 600 is arranged to, responsive to the load change ΔL to the load L, control the fuel supply means 127 to supply fuel at the fuel mass flow rate $m_{total}$ to the combustor 102. In one example, the controller 600 is arranged to determine the fuel mass flow rate $m_{total}$ corresponding with the new air mass flow rate $\bar{m}_{TR}$.

In one example, the PI controller 670 is arranged to determine the new air mass flow rate $\bar{m}_{TR}$ based, at least in part, on the sum, provided by the summation unit 660, of the determined rate of change of the rotational speed dn/dt and the product of the determined correction factor CF and the determined rate of change of the rotational speed dn/dt (i.e. on the acceleration/deceleration error of the compressor 101). In one example, the PI controller 670 is arranged to provide the determined new total fuel mass flow rate $m_{total}$ to the selector 680.

In one example, the PI controller 670 is arranged to determine the fuel mass flow rate $m_{total}$ to be supplied by the fuel supply means 127 to the combustor 102 based, at least in part, on the sum, provided by the summation unit 660, of the determined rate of change of the rotational speed dn/dt and the product of the determined correction factor CF and the determined rate of change of the rotational speed dn/dt (i.e. on the acceleration/deceleration error of the compressor 101). In one example, the PI controller 670 is arranged to provide the determined fuel mass flow rate $m_{total}$ to the selector 680.

In one example, the selector 680 is arranged to provide the determined new total fuel mass flow rate $m_{total}$ to the gas turbine 100, for example to the compressor 101, thereby controlling the gas turbine 100 according to the determined new air mass flow rate $\bar{m}_{TR}$. In one example, the selector 680 is arranged to provide the determined new total fuel mass flow rate $m_{total}$ to the real-time model unit 610, thereby feeding this value back into the real-time model.

In one example, the selector 680 is arranged to provide the determined fuel mass flow rate $m_{total}$ to the gas turbine 100, for example to the fuel supply means 127, thereby controlling the gas turbine 100 according to the determined fuel mass flow rate $m_{total}$. In one example, the selector 680 is arranged to provide the determined fuel mass flow rate $m_{total}$ to the real-time model unit 610, thereby feeding this value back into the real-time model.

At S601, the real-time model unit 610 receives the rotational speed $\bar{n}$ from the gas turbine 100. More generally, at S601, the real-time model unit 610 receives all available measurements from the gas turbine 100, for example speeds, pressures and/or temperatures at different engine stations.

At S602, the real-time model unit 610 determines the estimate of the new air mass flow rate $\bar{m}_{TR}$ based, at least in part, on the received rotational speed $\bar{n}$, as described above, and provides the estimate of the new air mass flow rate $\bar{m}_{TR}$ to the correction factor determination unit 620.

At S603, the correction factor determination unit 620 receives the rotational speed $\bar{n}$ from the gas turbine 100.

At S604, the correction factor determination unit 620 determines the correction factor CF based, at least in part, on the received rotational speed $\bar{n}$ and the estimate of the new air mass flow rate $\bar{m}_{TR}$ provided by the real-time model unit 610, as described above, and provides the determined correction factor CF to the multiplication unit 640.

At S605, the acceleration/deceleration schedule unit 630 receives the rotational speed $\bar{n}$ from the gas turbine 100.

At S606, the acceleration/deceleration schedule unit 630 determines the rate of change of the rotational speed dn/dt corresponding to the load change ΔL to the load L as a function of the received rotational speed $\bar{n}$ as an estimated acceleration/deceleration demand of the compressor 101 and provides an allowable, for example acceptable, permissible, permitted, tolerable or sustainable, acceleration/deceleration demand to the multiplication unit 640.

At S607, the multiplication unit 640 multiplies (i.e. calculates the product of) the determined correction factor CF provided by the correction factor determination unit 620 and the allowable acceleration/deceleration demand of the compressor 101 provided by the acceleration/deceleration schedule unit 630, thereby providing the corrected allowable acceleration/deceleration demand of the compressor 101. The multiplication unit 640 provides the corrected allowable acceleration/deceleration demand of the compressor 101 to the summation unit 660.

At S608, the acceleration/deceleration determination unit 650 receives the rotational speed Ft from the gas turbine 100.

At S609, the acceleration/deceleration determination unit 650 determines the rate of change of the rotational speed dn/dt corresponding to the load change ΔL to the load L based on the received rotational speed $\bar{n}$ (i.e. an actual value rather than an estimate, for example) and provides the determined rate of change of the rotational speed dn/dt to the summation unit 660.

At S610, the summation unit 660 sums the determined rate of change of the rotational speed dn/dt provided by the acceleration/deceleration determination unit 650 and the corrected acceleration/deceleration demand of the compressor 101, thereby providing an acceleration/deceleration error of the compressor 101 as a difference between the corrected acceleration/deceleration demand and the actual value provided by the acceleration/deceleration determination unit 650. The summation unit 660 provides this acceleration/deceleration error of the compressor 101 to the PI controller 670.

At S611, the PI controller 670 determines the new fuel mass flow rate $m_{total}$ based, at least in part, on the acceleration/deceleration error of the compressor 101, as described above. In this example, the PI controller 670 determines the fuel mass flow rate $m_{total}$ to be supplied by the fuel supply means 127 to the combustor 102. The PI controller 670 provides the fuel mass flow rate $m_{total}$ to the selector 680.

At S612, the selector 680 provides the determined new fuel mass flow rate to the gas turbine 100, thereby controlling the gas turbine 100 according to the determined new air mass flow rate $\bar{m}_{TR}$. The selector 680 provides the determined fuel mass flow rate $m_{total}$ to the gas turbine 100, for example to the fuel supply means 127, thereby controlling the gas turbine 100 according to the determined fuel mass flow rate $m_{total}$. More generally, at S612, the selector 680 may provide the total, the pilot and/or the main fuel demands to the gas turbine 100. The selector 680 may additionally provide other and/or all demands, for example variable guide vane (VGV) demand and/or blow off valve (BOV) demand, to the gas turbine 100.

At S613, the selector 680 provides the determined fuel mass flow rate $m_{total}$ to the real-time model unit 610, thereby feeding this value back into the real-time model. More generally, at S613, the selector 680 may provide the total, the pilot and/or the main fuel demands to the real-time model unit 610. The selector 680 may additionally provide other and/or all demands, for example variable guide vane (VGV) demand and/or blow off valve (BOV) demand, to the real-time model unit 610.

Figure 7:
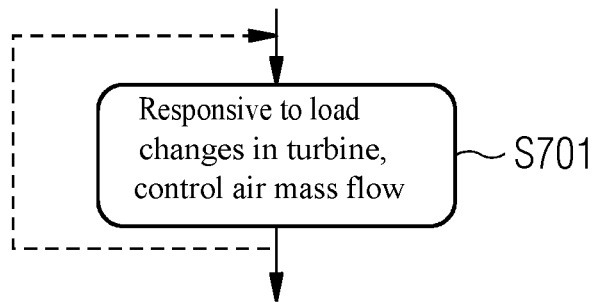
FIG. 7 shows a schematic view of a method of controlling a gas turbine according to an exemplary embodiment.

FIG. 7 shows a schematic view of a method of controlling the gas turbine 100 according to an exemplary embodiment.

The method is of controlling the gas turbine 100 arranged to supply the load L, the gas turbine 100 comprising the compressor 101 arranged to operate at a rotational speed $\bar{n}$, a combustor 102 and a fuel supply means 127 comprising a first fuel supply means and a second fuel supply means, wherein the compressor 101 is arranged to provide air to the combustor 102 at a steady state air mass flow rate $\bar{m}_{SS}$ and wherein the fuel supply means 127 is arranged to supply fuel at a fuel mass flow rate $m_{total}$ to the combustor 102.

At S701, responsive to the load change ΔL to the load L, the compressor 101 is controlled to provide air to the combustor 102 at the new air mass flow rate $\bar{m}_{TR}$, wherein the new air mass flow rate $\bar{m}_{TR}$ is within the range between the first threshold and the second threshold $\bar{m}_{SUR}$.

Optionally, the method comprises repeating S701, for example successively, periodically, regularly and/or irregularly, responsive to subsequent load changes ΔL.

The method may include any of the steps described herein.

Figure 8:
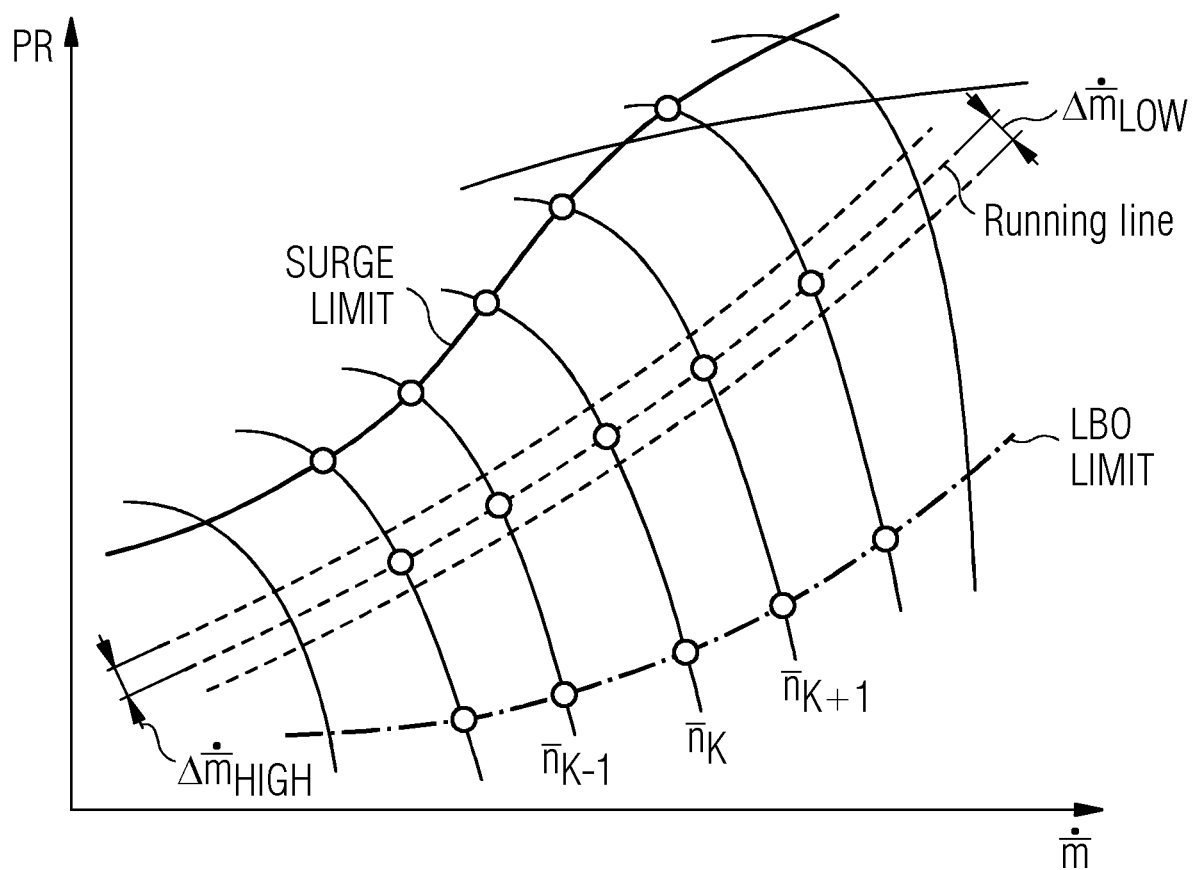
FIG. 8 shows a schematic view of a method of controlling a gas turbine according to an exemplary embodiment.

FIG. 8 shows a schematic view of a method of controlling the gas turbine 100 according to an exemplary embodiment. Particularly, FIG. 8 shows a pressure map for the gas turbine 100 in which a compressor pressure ratio PR is plotted as a function of compressor air mass flow rate $\bar{m}$. The compressor pressure ratio PR is the ratio of the compressor outlet pressure to the compressor inlet pressure.

The pressure map includes a running line for a steady state air mass flow rate $\bar{m}_{SS}$, for which the compressor pressure ratio PP is approximately proportional to the compressor air mass flow rate $\bar{m}$. The pressure map includes the first, lower threshold $\bar{m}_{LBO}$, which is the lean blow out (LBO) limit, corresponding with loss of the burner flame 30, at lower compressor pressure ratios PR than the running line for the same compressor air mass flow rate $\bar{m}$ and which diverges away from the running line at higher compressor air mass flow rates $\bar{m}$. The pressure map includes the second, upper threshold $\bar{m}_{SUR}$, which is the surge limit, corresponding with surge instability of the compressor 101, at higher compressor pressure ratios PR than the running line for the same compressor air mass flow rate $\bar{m}$ and which diverges away from the running line at higher compressor air mass flow rates $\bar{m}$ before converging theretowards. The pressure map includes a third threshold $\Delta\bar{m}_{LOW}$, proximal and parallel to the running line, which is within a range between the steady state air mass flow rate $\bar{m}_{SS}$ (i.e. the running line) and the first threshold $\bar{m}_{SUR}$. The pressure map includes a fourth threshold $\Delta\bar{m}_{HIGH}$, proximal and parallel to the running line, which is within a range between the steady state air mass flow rate $\bar{m}_{SS}$ and the second threshold $\bar{m}_{SUR}$. The third threshold $\Delta\bar{m}_{LOW}$ and the fourth threshold $\Delta\bar{m}_{HIGH}$ correspond with moderate transient events. The pressure map includes also a plurality, specifically seven in this example, of approximately mutually equispaced rotational speed lines, transverse to the running line, the first threshold $\bar{m}_{LBO}$, the second threshold $\bar{m}_{SUR}$, the third threshold $\Delta\bar{m}_{LOW}$ and the fourth threshold $\Delta\bar{m}_{HIGH}$. Three rotational speed lines $\bar{n}_{K-1}$, $\bar{n}_K$ and $\bar{n}_{K+1}$, corresponding to three adjacent rotational speeds $\bar{n}$, are labelled.

Figure 9:
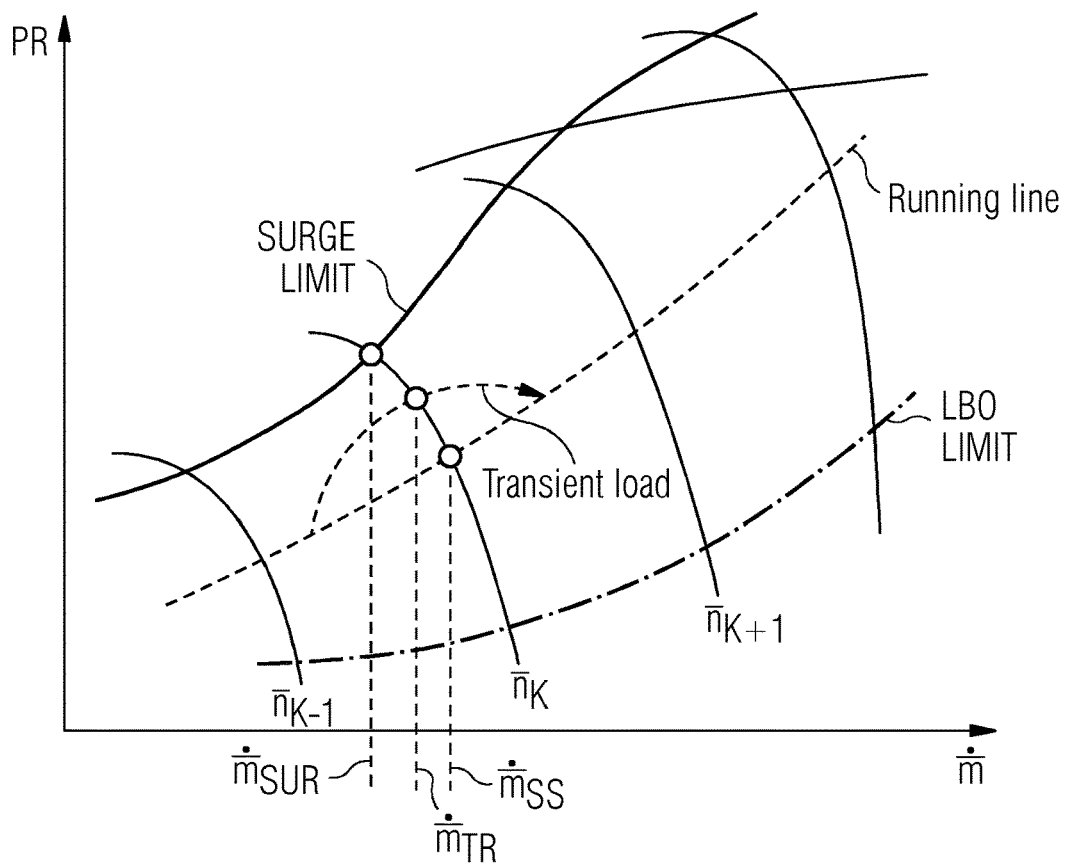
FIG. 9 shows a schematic view of a method of controlling a gas turbine according to an exemplary embodiment.

FIG. 9 shows a schematic view of a method of controlling the gas turbine 100 according to an exemplary embodiment. Particularly, FIG. 9 shows an example of the pressure map, as described with reference to FIG. 8, for acceleration scheduling during load acceptance due to a positive transient load change ΔL. As shown by the curved arrow in FIG. 9, during load acceptance due to the positive transient load change ΔL, the gas turbine 100 is controlled to move from the initial steady state air mass flow rate $\bar{m}_{SS}$ running line to operate at the new air mass flow rate $\bar{m}_{TR}$, between the steady state air mass flow rate $\bar{m}_{SS}$ and the second threshold $\bar{m}_{SUR}$, before returning to operate on the steady state air mass flow rate $\bar{m}_{SS}$ running line, following load acceptance. In this way, the gas turbine 100 may be controlled to operate closer to the second threshold $\bar{m}_{SUR}$, allowing the gas turbine 100 to accept larger positive load changes ΔL without surging.

Figure 10:
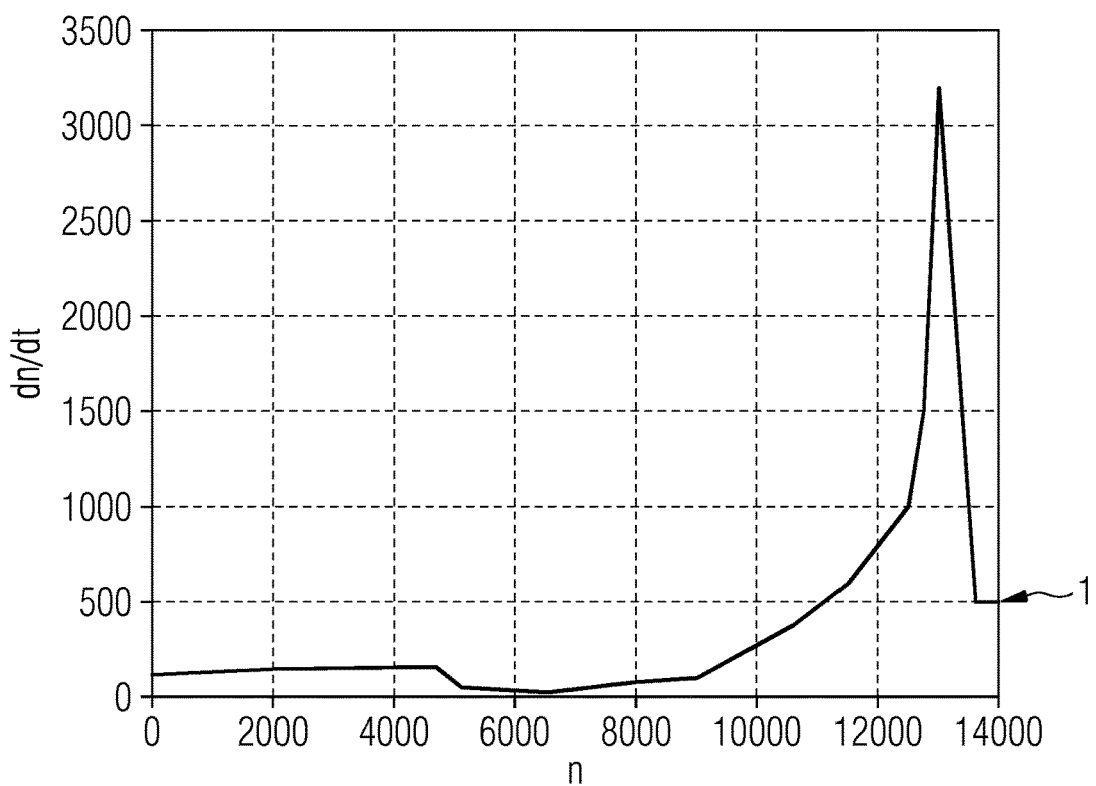
FIG. 10 shows a schematic view of a method of controlling a gas turbine according to an exemplary embodiment.

FIG. 10 shows a schematic view of a method of controlling a gas turbine according to an exemplary embodiment. Particularly, FIG. 10 shows a graph of a nominal acceleration schedule in which rate of change of the rotational speed dn/dt (i.e. acceleration) is plotted as a function of rotational speed $\bar{n}$. The acceleration slowly increases as a function of rotational speed $\bar{n}$ and spikes to a maximum of approximately 3,200 at a rotational speed of approximately 13,000 before decreasing at higher speeds. A normal operating range of the rotational speed $\bar{n}$ is from approximately 11,000 to 13,000, in this example.

Figure 11:
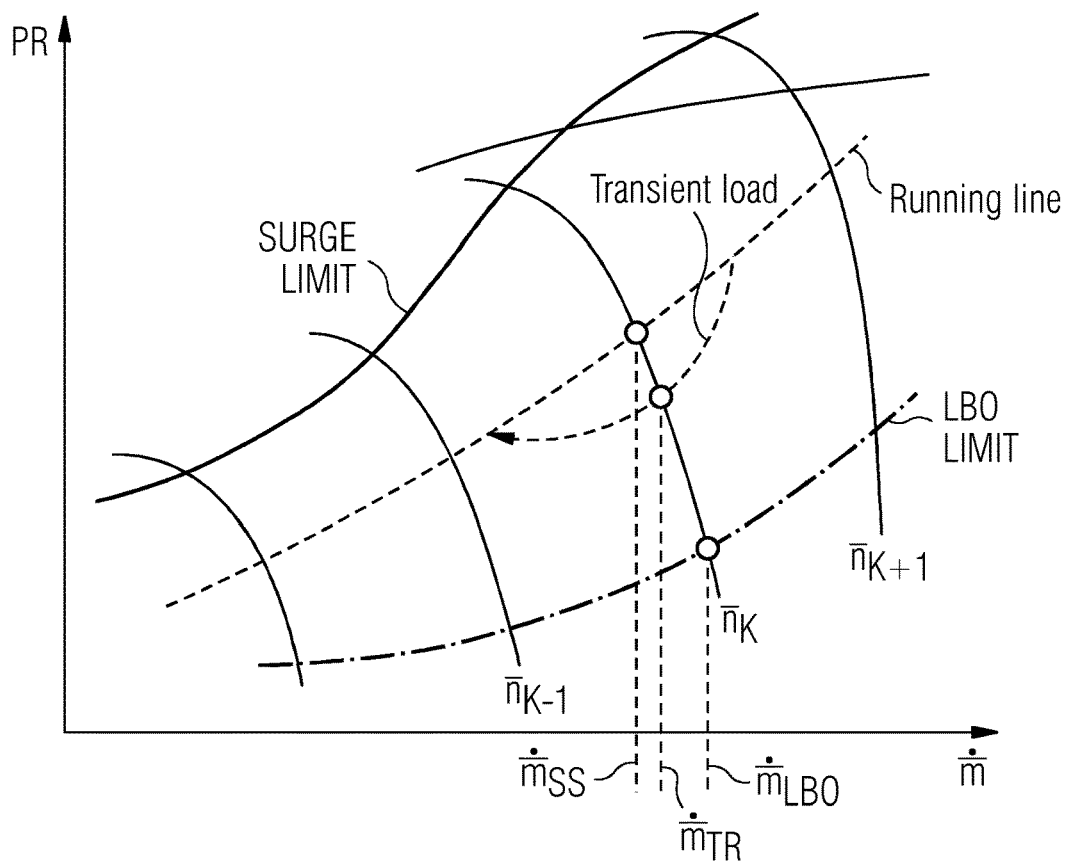
FIG. 11 shows a schematic view of a method of controlling a gas turbine according to an exemplary embodiment.

FIG. 11 shows a schematic view of a method of controlling the gas turbine 100 according to an exemplary embodiment. Particularly, FIG. 11 shows an example of the compressor pressure ratio map, as described with reference to Figure R, for deceleration scheduling during load rejection due to a negative transient load change ΔL. As shown by the curved arrow in FIG. 9, during load rejection due to the negative transient load change ΔL, the gas turbine 100 is controlled to move from the initial steady state air mass flow rate $\bar{m}_{SS}$ running line to operate at the new air mass flow rate $\bar{m}_{TR}$, between the steady state air mass flow rate $\bar{m}_{SS}$ and the first threshold $\bar{m}_{LBO}$, before returning to operate on the steady state air mass flow rate $\bar{m}_{SS}$ running line, following load rejection. In this way, the gas turbine 100 may be controlled to operate closer to the first threshold $\bar{m}_{LBO}$, allowing the gas turbine 100 to accept larger negative load changes ΔL without loss of flame.

Figure 12:
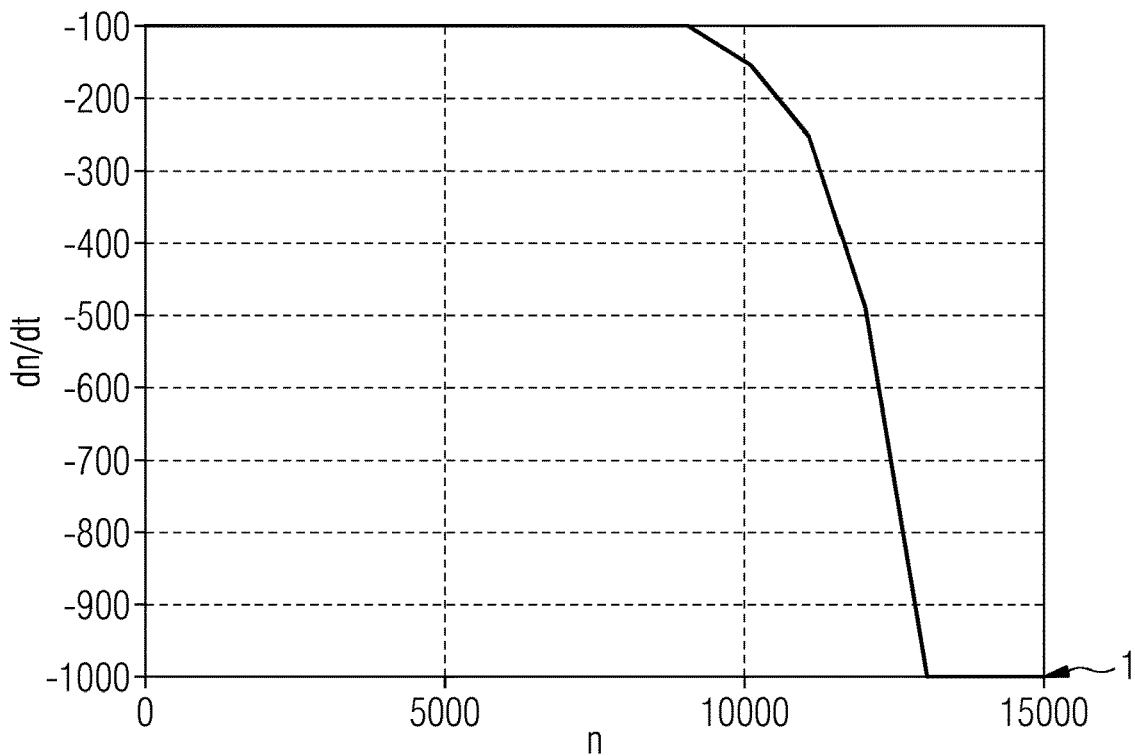
FIG. 12 shows a schematic view of a method of controlling a gas turbine according to an exemplary embodiment.

FIG. 12 shows a schematic view of a method of controlling a gas turbine according to an exemplary embodiment. Particularly, FIG. 12 shows a graph of a nominal deceleration schedule in which rate of change of the rotational speed dn/dt (i.e. deceleration) is plotted as a function of rotational speed $\bar{n}$. The acceleration is constant as a function of rotational speed to approximately 9,000 before decreasing at higher speeds, in this example.

FIG. 13 shows a schematic view of a controller 700 according to an exemplary embodiment. Particularly, FIG. 13 shows a schematic view of the controller 700 communicatively coupled to the gas turbine 100.

In one example, the controller 700 comprises the controller 600 or vice versa.

The controller 700 is for the gas turbine 100. The gas turbine 100 comprises the compressor 101 arranged to operate at a rotational speed the combustor 102 and the fuel supply means 127 comprising the first fuel supply means and the second fuel supply means, wherein the compressor 101 is arranged to provide air to the combustor 102 at a steady state air mass flow rate $\bar{m}_{SS}$ and wherein the fuel supply means 127 is arranged to supply fuel at a fuel mass flow rate to the combustor 102. The controller 700 is arranged to, responsive to a load change ΔL to the load L, control the fuel supply means 127 to supply a proportion Z of the fuel mass flow rate $m_{total}$ as a fuel mass flow $\dot{m}_{fuel\_pilot}$ rate via the first fuel supply means based, at least in part, on a combustor mass flow rate $\dot{m}_t$.

It should be understood that the combustor mass flow rate $\bar{m}_t$ is a sum of an air mass flow rate $\bar{m}$ (for example, the steady state air mass flow rate $\bar{m}_{SS}$ or the new air mass flow rate $\bar{m}_{TR}$) and the fuel mass flow rate $m_{total}$ of the air and of the fuel, respectively, provided to the combustor 102 by the compressor 101 and supplied by the fuel supply means 127, respectively, for a current time step t. The current time step t may be in a range from 1 ms to 100 ms, preferably from 10 to 50 ms.

In this example, the controller 700 comprises a real-time model unit 710, a one time step delay unit 790, an acceleration/deceleration schedule unit 730, a multiplication unit 740 and a selector unit 780. Other arrangements are possible.

The real-time model unit 710, the acceleration/deceleration schedule unit 730, the multiplication unit 740 and/or the selector unit 780 may comprise and/or be as described above with respect to the real-time model unit 610, the acceleration/deceleration schedule unit 630, the multiplication unit 640 and/or the selector unit 680, respectively.

In one example, the real-time model unit 710 is arranged to determine the combustor mass flow rate $m_t$. In one example, the real-time model unit 710 is arranged to determine the combustor mass flow rate $m_t$ based, at least in part, on a real-time model of the gas turbine 100. In one example, the real-time model unit 710 is arranged to determine the combustor mass flow rate $m_t$ based, at least in part, on the rotational speed $\bar{n}$. In one example, the real-time model unit 710 is arranged to receive the rotational speed $\bar{n}$ from the gas turbine 100. In one example, the real-time model unit 710 is arranged to provide the determined combustor mass flow rate $m_t$ to the time step delay unit 790 and/or to the multiplication unit 740.

In one example, the real-time model unit 710 comprises a real-time (also known as a dynamic) model of the gas turbine 100 described mathematically by a set of nonlinear differential equations, as described above with respect to the real-time model unit 610:

$$\dot{x}=f_x(x,h,u,v)$$

where the distributed aero-thermodynamic, mechanical and electrical processes are included in a state coordinate vector $\dot{x}$. For n state variables, n sets of the above equation may be written. Controls, u, operating conditions, v, and health parameters, h, are quantities which may be distinguished by measurement and/or manipulation.

Measurements (also known as sensed parameters) may be taken on various quantities in the gas turbine 100. These sensed parameters may be related to the states, inputs and parameters according to the general algebraic expression:

$$y=g_y(x,h,u,v)$$

Where, in general, vector y comprises measurable and non-measurable parameters. These above equations for the state coordinate vector $\bar{x}$ and the vector y may be general enough to provide a starting point to describe the gas turbine 100 with respect to control design and state estimation.

After an accurate model is developed for the generic baseline, this gas turbine model may be expanded to include data representing the deteriorated gas turbine 100 (i.e. following use of the gas turbine 100, for example following commissioning and/or extended use thereof). Deterioration effects may include efficiency changes, area changes, pressure drops, as well as flow changes and disturbances due to bleed effects, for example. Typically, the two quantities of capacity and efficiency may be used to model changes in operation of the gas turbine 100 resulting in decreased energy conversion efficiency or component flow characteristics.

In one example, the real-time model is as described in WO 2015/117791 and/or WO 2017/198528.

In one example, the controller 700 is arranged to control the proportion Z of the fuel mass flow rate $m_{total}$ as the fuel mass flow rate $\dot{m}_{fuel\_pilot}$ supplied via the first fuel supply means is based, at least in part, on a previous combustor mass flow rate $\dot{m}_{t-1}$ supplied in a previous time step t-1. In one example, the previous time step t-1 is one (i.e. only, a single or exactly one) time step preceding the current time step t.

In one example, the time step delay unit 790 is arranged to determine the previous combustor mass flow rate $\dot{m}_{t-1}$ supplied in a previous time step t-1, for example corresponding to the determined combustor mass flow rate $m_t$ for the current time step t received from the real-time model unit 710. In one example, the time step delay unit 790 is arranged to obtain the previous combustor mass flow rate for example from a memory block, for example a look-up table or a map.

In one example, the controller 700 is arranged to control the proportion Z of the fuel mass flow rate $m_{total}$ as the fuel mass flow rate $\dot{m}_{fuel\_pilot}$ supplied via the first fuel supply means based, at least in part, on the previous combustor mass flow rate $\dot{m}_{T-1}$ supplied in the previous time step t-1, wherein the previous combustor mass flow rate $\dot{m}_{t-1}$ is provided from a set thereof.

In one example, the time step delay unit 790 is arranged to obtain the previous combustor mass flow rate $\dot{m}_{t-1}$ for the previous time step t-1, for example from a memory block, for example a look-up table or a map. In one example, the time step delay unit 790 is arranged to provide the combustor mass flow rate $\dot{m}_t$ to the acceleration/deceleration schedule unit 730 which contains the memory block, for example a look-up table or a map.

In one example, the controller 700 is arranged to, responsive to the load change ΔL to the load L, control the fuel supply means 127 to supply the proportion Z of the fuel mass flow rate $m_{total}$ as the fuel mass flow rate $\dot{m}_{fuel\_pilot}$ via the first fuel supply means based, at least in part, on an estimated acceleration/deceleration first fuel (also known as pilot) demand obtained from a acceleration/deceleration schedule as a function of the combustor mass flow rate for the previous time step t-1, for example from an acceleration/deceleration schedule thereof. The estimated acceleration/deceleration first fuel demand may be determined generally from a ratio of the fuel mass flow rate $\overline{\dot{m}}_{fuel\_pilot}$ to the combustor mass flow rate $\dot{m}$:

$$\frac{\dot{m}_{fuel\_pilot}}{\dot{m}}$$

In one example, the acceleration/deceleration schedule unit 730 is arranged to determine the estimated acceleration/deceleration first fuel demand based, at least in part, on the combustor mass flow rate $\dot{m}_{t-1}$ for the previous time step t-1 provided by the time step unit 790. In one example, the acceleration/deceleration schedule unit 730 is arranged to determine the estimated acceleration/deceleration first fuel demand as a ratio of the fuel mass flow rate $\dot{m}_{fuel\_pilot}$ to the combustor mass flow rate $\dot{m}_{t-1}$ for the previous time step t-1, for example from an acceleration/deceleration schedule thereof. In one example, the acceleration/deceleration schedule unit 730 is arranged to provide the estimated acceleration/deceleration first fuel demand to the multiplication unit 740.

In one example, the multiplication unit 740 is arranged to multiply (i.e. calculate the product of) the combustor mass flow rate $\dot{m}_t$ for the current time step t provided by the real-time model unit 710 and the estimated acceleration/deceleration first fuel demand provided (i.e. determined from the combustor mass flow rate $\dot{m}_{t-1}$ for the previous time step t-1) by the acceleration/deceleration schedule unit 730, thereby providing a corrected acceleration/deceleration first fuel demand. The corrected acceleration/deceleration first fuel demand may be thus expressed as:

$$\dot{m}_{fuel\_pilot} \times \frac{\dot{m}_t}{\dot{m}_{t-1}}$$

In one example, the multiplication unit 740 is arranged to provide the corrected acceleration/deceleration first fuel demand to the selector 780.

In one example, the selector 780 is arranged to provide the corrected acceleration/deceleration first fuel demand to the gas turbine 100, for example to the fuel supply means 127, thereby controlling the gas turbine 100 according to the corrected acceleration/deceleration first fuel demand schedule. In one example, the selector 780 is arranged to provide the corrected acceleration/deceleration first fuel demand to the real-time model unit 710 (thereby feeding this value back into the real-time model) and to the gas turbine 100.

In one example, the proportion 7: of the fuel mass flow rate $m_{total}$ as the fuel mass flow rate $\dot{m}_{fuel\_pilot}$ supplied via the first fuel supply means is within a range between a first pilot threshold $\dot{m}_{LBO}$ and a second pilot threshold $\dot{m}_{TR}$.

In one example, the first pilot threshold $\dot{m}_{LBO}$ corresponds with loss of a pilot flame of the combustor 102.

In one example, the second pilot threshold $\dot{m}_{TT}$ corresponds with overheating of a burner of the combustor 102.

In one example, the first pilot threshold $\dot{m}_{LBO}$ is predetermined for the gas turbine 100, for example according to data obtained therefrom, included in the real-time model and/or in the acceleration/deceleration schedule, as described above.

In one example, the second pilot threshold $\dot{m}_{TT}$ is predetermined for the gas turbine 100, for example according to data obtained therefrom, included in the real-time model and/or in the acceleration/deceleration schedule, as described above.

In one example, the proportion 2 of the fuel mass flow rate as the fuel mass flow rate $\dot{m}_{fuel\_pilot}$ supplied via the first fuel supply means is below the first pilot threshold $\dot{m}_{TT}$ for at most a predetermined first duration, for example in a range of 1 to 100 time steps, preferably in a range from 1 to 10 time steps, more preferably in a range from 1 to 5 time steps, for example 3 time steps. Temporary deviations below the first pilot threshold $\dot{m}_{LBO}$ may be acceptable. The time step may be in a range from 1 ms to 100 ms, preferably from 10 to 50 ms.

In one example, the proportion Z of the fuel mass flow rate $m_{total}$ as the fuel mass flow rate $\dot{m}_{fuel\_pilot}$ supplied via the first fuel supply means is above the second pilot threshold $\dot{m}_{TT}$ for at most a predetermined second duration, for example in a range of 1 to 100 time steps, preferably in a range from 1 to 10 time steps, more preferably in a range from 1 to 5 time steps, for example 3 time steps. Temporary deviations above the second pilot threshold $\dot{m}_{TT}$ may be acceptable. The time step may be in a range from 1 ms to 100 ms, preferably from 10 to 50 ms.

In one example, controlling the proportion Z of the fuel mass flow rate $m_{total}$ as the fuel mass flow rate $\dot{m}_{fuel\_pilot}$ supplied via the first fuel supply means comprises decreasing the proportion Z if the load change ΔL to the load L is positive.

In one example, controlling the proportion Z of the fuel mass flow rate $m_{total}$ as the fuel mass flow rate $\dot{m}_{fuel\_pilot}$ supplied via the first fuel supply means comprises increasing the proportion Z if the load change ΔL to the load is negative.

At S1301, the real-time model unit 710 receives all available measurements from the gas turbine 100, for example speeds, pressures and/or temperatures at different engine stations.

At S1302, the real-time model unit 710 determines the combustor mass flow rate $\dot{m}_t$ based, at least in part, the fuel mass flow rate $\dot{m}_{total}$ for the current time step it, as described above, and provides the combustor mass flow rate $m_t$ to the to the time step unit 790.

At S1303, the time step unit 790 obtains the previous combustor mass flow rate $\dot{m}_{t-1}$ for the previous time step t-1, for example from a memory block for example a look-up table or a map, and provides the previous combustor mass flow rate $\dot{m}_{t-1}$ for the previous time step t-1 to the acceleration/deceleration schedule unit 730.

At S1304, the acceleration/deceleration schedule unit 730 determines the estimated acceleration/deceleration first fuel demand based, at least in part, on the combustor mass flow rate $\dot{m}_{t-1}$ for the previous time step t-1 provided by the time step unit 790, from an acceleration/deceleration schedule thereof, and provides the estimated acceleration/deceleration first fuel demand to the multiplication unit 740.

At S1305, the real-time model unit 710 provides the combustor mass flow rate $m_t$ to the multiplication unit 740.

At S1306, the multiplication unit 740 multiplies (i.e. calculates the product of) the combustor mass flow rate $\dot{m}_t$ for the current time step t provided by the real-time model unit 710 and the estimated acceleration/deceleration first fuel demand provided (i.e. determined from the combustor mass flow rate $\dot{m}_{t-1}$ for the previous time step t-1) by the acceleration/deceleration schedule unit 730, thereby providing the corrected acceleration/deceleration first fuel demand expressed as:

$$\dot{m}_{fuel\_pilot} \times \frac{\dot{m}_t}{\dot{m}_{t-1}}$$

The multiplication unit 740 provides the corrected acceleration/deceleration first fuel demand to the selector 780.

At S1307, the selector 780 provides the corrected acceleration/deceleration first fuel demand to the gas turbine 100, for example to the fuel supply means 127, thereby controlling the gas turbine 100 according to the corrected acceleration/deceleration first fuel demand. More generally, at S1307, the selector 780 may provide the total, the pilot and/or the main fuel demands to the gas turbine 100. The selector 780 may additionally provide other and/or all demands, for example variable guide vane (VGV) demand and/or blow off valve (BOV) demand, to the gas turbine 100.

At S1308, the selector 780 provides the corrected acceleration/deceleration first fuel demand to the real-time model unit 710, thereby feeding this value back into the real-time model. More generally, at S1308, the selector 780 may provide the total, the pilot and/or the main fuel demands to the real-time model unit 710. The selector 780 may additionally provide other and/or all demands, for example variable guide vane (VGV) demand and/or blow off valve (BOV) demand, to the real-time model unit 710.

FIG. 14 shows a schematic view of a method of controlling the gas turbine 100 according to an exemplary embodiment.

The method is of controlling the gas turbine 100 arranged to supply the load L, the gas turbine 100 comprising the compressor 101 arranged to operate at a rotational speed $\bar{n}$, a combustor 102 and a fuel supply means 127 comprising a first fuel supply means and a second fuel supply means, wherein the compressor 101 is arranged to provide air to the combustor 102 at a steady state air mass flow rate $\overline{\dot{m}}_{SS}$ and wherein the fuel supply means 127 is arranged to supply fuel at a fuel mass flow rate $m_{total}$ to the combustor 102.

At S1401, responsive to a load change ΔL to the load L, the fuel supply means 127 is controlled to supply the proportion Z of the fuel mass flow rate $m_{total}$ as the fuel mass flow rate $\dot{m}_{fuel\_pilot}$ via the first fuel supply means based, at least in part, on the combustor mass flow rate $\dot{m}_t$.

Optionally, the method comprises repeating S1401, for example successively, periodically, regularly and/or irregularly, responsive to subsequent load changes ΔL.

The method may comprise any of the method steps described herein, for example including as described with respect to FIG. 7.

Figure 15:
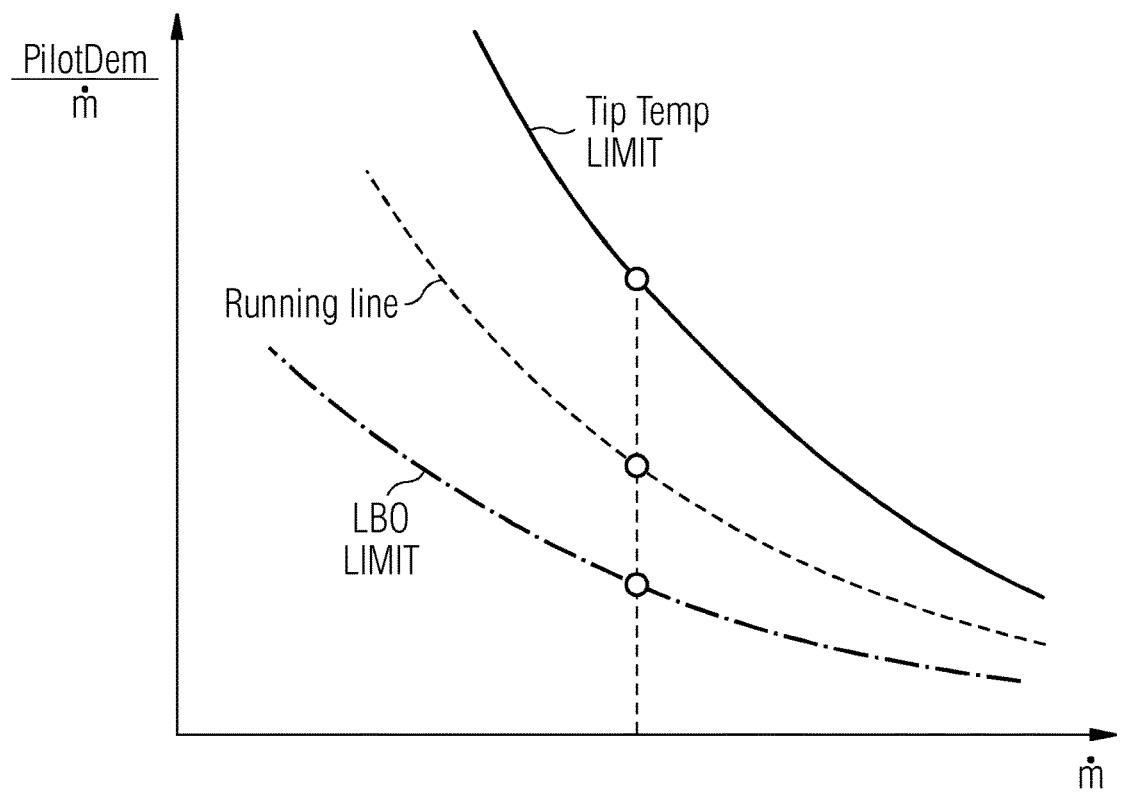
FIG. 15 shows a schematic view of a method of controlling a gas turbine according to an exemplary embodiment.

FIG. 15 shows a schematic view of a method of controlling the gas turbine 100 according to an exemplary embodiment. Particularly, FIG. 15 shows a pilot split map (also known as an acceleration/deceleration pilot demand schedule) for the gas turbine 100 in which a pilot fuel demand split is plotted as a function of combustor mass flow rate $\dot{m}_t$. The pilot fuel demand split is the ratio of the fuel mass flow rate $\dot{m}_{fuel\_pilot}$ to the combustor mass flow rate $\dot{m}$:

$$\frac{PilotDem}{\dot{m}} = \frac{\dot{m}_{fuel\_pilot}}{\dot{m}}$$

The pilot split map includes a running line for a steady state combustor mass flow rate $\dot{m}_t$, for which the pilot fuel demand split is approximately inversely proportional to the combustor mass flow rate $\dot{m}$. The fuel map includes the first, lower pilot threshold $\dot{m}_{LBO}$, which is the lean blow out (LBO) limit, corresponding with loss of the pilot flame, at lower pilot fuel demand splits than the running line for the same combustor mass flow rate $\dot{m}$ and which converges towards the running line at higher combustor mass flow rate $\dot{m}$. The pressure map includes the second, upper pilot threshold $\dot{m}_{TT}$, which is the tip temperature limit, corresponding with overheating of the burner, at higher pilot fuel demand splits than the running line for the same combustor mass flow rate $\dot{m}$ and which converges towards the running line at higher combustor mass flow rate $\dot{m}$.

Figure 16:
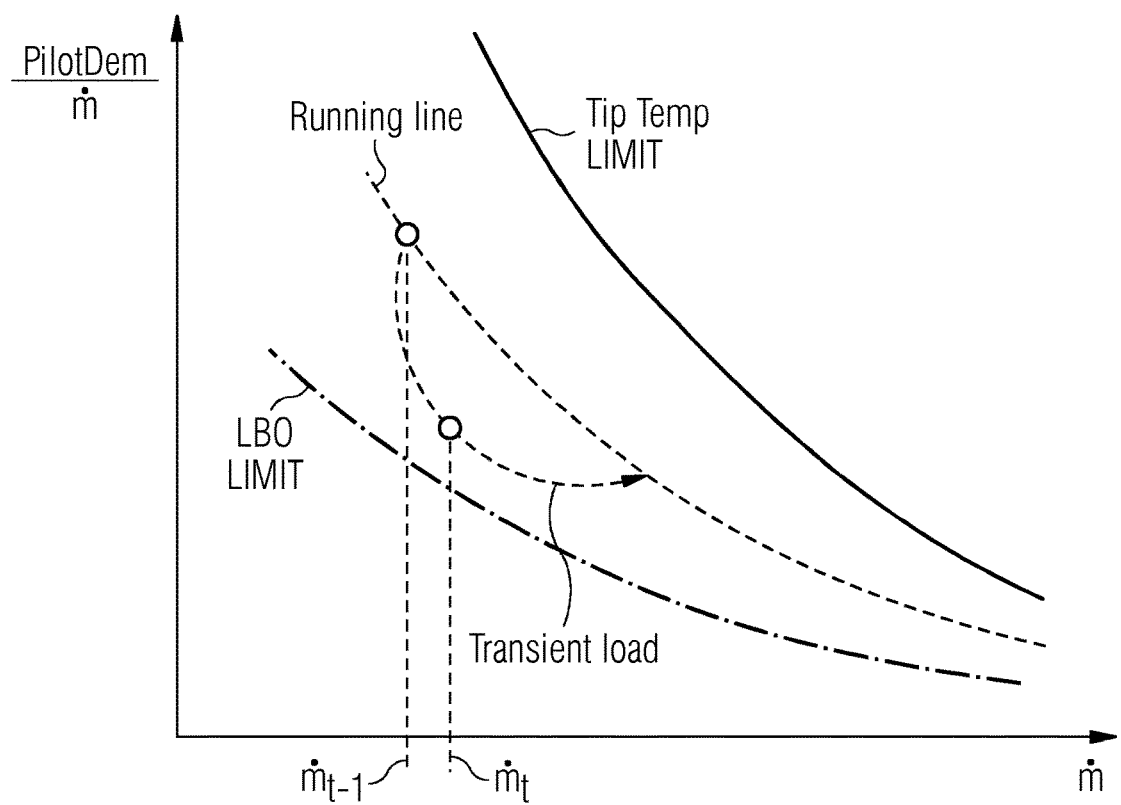
FIG. 16 shows a schematic view of a method of controlling a gas turbine according to an exemplary embodiment.

FIG. 16 shows a schematic view of a method of controlling the gas turbine 100 according to an exemplary embodiment. Particularly, FIG. 16 shows an example of the pilot split map, as described with reference to FIG. 15, for acceleration scheduling during load acceptance due to a positive transient load change ΔL. As shown by the curved arrow in FIG. 16, during load acceptance due to the positive transient load change ΔL, the gas turbine 100 is controlled to move from the initial pilot fuel demand split on the running line, corresponding with the previous combustor mass flow rate $\dot{m}_{t-1}$ supplied in a previous time step t-1, to operate at the new pilot fuel demand split between the steady state combustor mass flow rate rh and the first pilot threshold $\dot{m}_{LBO}$ (i.e. a lower pilot fuel demand split), before returning to operate on the steady state combustor mass flow rate $\dot{m}$ running line, following load acceptance. In this way, the gas turbine 100 may be controlled to operate closer to the first pilot threshold $\dot{m}_{LBO}$, allowing the gas turbine 100 to accept larger positive load changes ΔL without loss of pilot flame.

Figure 17:
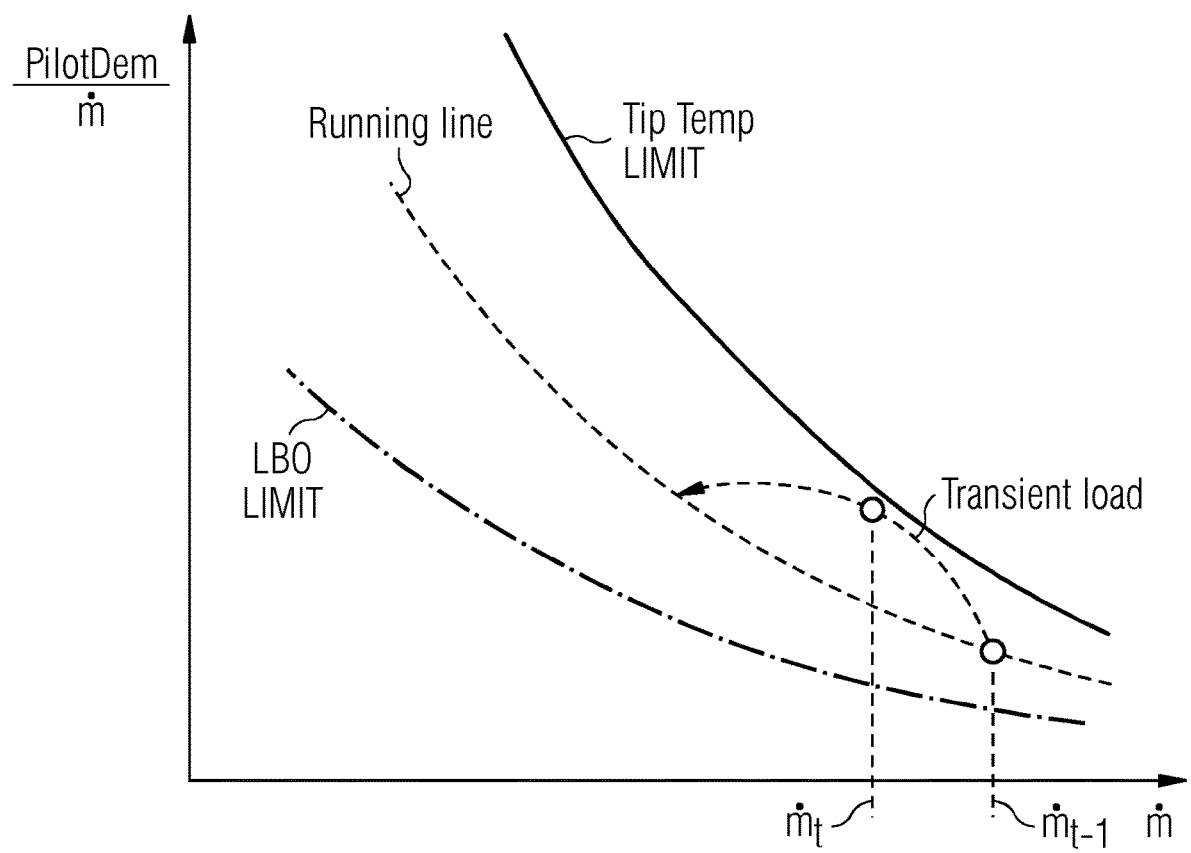
FIG. 17 shows a schematic view of a method of controlling a gas turbine according to an exemplary embodiment.

FIG. 17 shows a schematic view of a method of controlling the gas turbine 100 according to an exemplary embodiment. Particularly, FIG. 17 shows an example of the pilot split map, as described with reference to FIG. 15, for deceleration scheduling during load rejection due to a negative transient load change ΔL. As shown by the curved arrow in FIG. 16, during load rejection due to the negative transient load change ΔL, the gas turbine 100 is controlled to move from the initial pilot fuel demand split on the running line, corresponding with the previous combustor mass flow rate supplied in a previous time step t-1, to operate at the new pilot fuel demand split between the steady state combustor mass flow rate rh and the second pilot threshold $\dot{m}_{TT}$ (i.e. a higher pilot fuel demand split), before returning to operate on the steady state combustor mass flow rate $\dot{m}$ running line, following load rejection. In this way, the gas turbine 100 may be controlled to operate closer to the second pilot threshold $\dot{m}_{TT}$, allowing the gas turbine 100 to accept larger negative load changes ΔL without overheating of the pilot nozzle.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/ or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of controlling a gas turbine arranged to supply a load, the gas turbine comprising a compressor arranged to operate at a rotational speed, a combustor and a fuel supply comprising a first fuel supply and a second fuel supply, wherein the compressor is arranged to provide air to the combustor at a combustor air mass flow rate and wherein the fuel supply is arranged to supply fuel at a total fuel mass flow rate to the combustor, the method comprising:

detecting a load change to the load due to a transient of the gas turbine,
   controlling, in response to the detected load change and by way of a controller in a current time step, the fuel supply to supply to the combustor a proportion of the total fuel mass flow rate as a pilot fuel mass flow rate via the first fuel supply based, at least in part, on a combustor air mass flow rate determined in a time step preceding the current time step,
   wherein the proportion of the total fuel mass flow rate supplied to the combustor as the pilot fuel mass flow rate via the first fuel supply is within a range between a first pilot threshold and a second pilot threshold,
   wherein the first pilot threshold corresponds with loss of a pilot flame of the combustor,
   wherein the second pilot threshold corresponds with overheating of a burner of the combustor,
   wherein the first pilot threshold is pre-determined for the gas turbine,
   wherein the second pilot threshold is pre-determined for the gas turbine,
   wherein the controller comprises a memory storing a map of a plurality of relationships indicative of proportions of the total fuel mass flow rate supplied to the combustor as the pilot fuel mass flow rate as a function of combustor air mass flow rate, a first relationship of the plurality of relationships including a first line indicative of the first pilot threshold with respect to the combustor air mass flow rate, a second relationship of the plurality of relationships including a second line indicative of the second pilot threshold with respect to the combustor air mass flow rate, and a third relationship of the plurality of relationships including a third line indicative of proportions of the total fuel mass flow rate supplied to the combustor as the pilot fuel mass flow rate as a function of combustor air mass flow rate corresponding to a steady state combustor air mass flow rate, wherein the controller is configured to access the map stored in the memory, and
   wherein the controller is further configured to, in response to the load change being a positive load change corresponding to a load acceptance, shift the proportion of the total fuel mass flow rate supplied to the combustor as the pilot fuel mass flow rate from an initial point on the third line to a new point within a range between the third line and the first line.

2. The method according to claim 1, wherein the previous combustor mass flow rate is provided from a set of respective previous combustor mass flow rates.

3. The method according to claim 1, wherein the proportion of the total fuel mass flow rate supplied as the pilot fuel mass flow rate via the first fuel supply is below the first pilot threshold for at most a predetermined first duration.

4. The method according to claim 1, wherein the proportion of the total fuel mass flow rate supplied as the pilot fuel mass flow rate via the first fuel supply is above the second pilot threshold for at most a predetermined second duration.

5. The method according to claim 1, wherein the proportion of the total fuel mass flow rate supplied as the pilot fuel mass flow rate via the first fuel supply is decreased in response to the positive load change.

6. The method according to claim 1, further comprising shifting the proportion of the total fuel mass flow rate supplied to the combustor as the pilot mass flow rate from the new point to the third line upon completion of the load acceptance.

7. The method according to claim 1, wherein the controller is further configured to, in response to the load change being a negative load change corresponding to a load rejection, shift the proportion of the total fuel mass flow rate supplied to the combustor as the pilot mass flow rate from the initial point on the third line to a new point within a range between the third line and the second line.

8. The method according to claim 7, wherein the proportion of the total fuel mass flow rate supplied as the pilot fuel mass flow rate via the first fuel supply is increased in response to the negative load change.

9. The method according to claim 7, further comprising shifting the proportion of the total fuel mass flow rate supplied to the combustor as the pilot mass flow rate from the new point to the third line upon completion of the load rejection.

10. A controller for a gas turbine, the gas turbine comprising a compressor arranged to operate at a rotational speed, a combustor and a fuel supply comprising a first fuel supply and a second fuel supply, wherein the compressor is arranged to provide air to the combustor at a combustor air mass flow rate and wherein the fuel supply is arranged to supply fuel at a total fuel mass flow rate to the combustor, wherein the controller is configured to:

responsive to a load change due to a transient of the gas turbine, control in a current time step the fuel supply to supply to the combustor a proportion of the total fuel mass flow rate as a pilot fuel mass flow rate via the first fuel supply based, at least in part, on a combustor air mass flow rate determined in a time step preceding the current time step,
   wherein the proportion of the total fuel mass flow rate supplied to the combustor as the pilot fuel mass flow rate via the first fuel supply is within a range between a first pilot threshold and a second pilot threshold,
   wherein the first pilot threshold corresponds with loss of a pilot flame of the combustor,
   wherein the second pilot threshold corresponds with overheating of a burner of the combustor, wherein the first pilot threshold is pre-determined for the gas turbine, wherein the second pilot threshold is pre-determined for the gas turbine, wherein the controller comprises a memory storing a map of a plurality of relationships indicative of proportions of the total fuel mass flow rate supplied to the combustor as the pilot fuel mass flow rate as a function of combustor air mass flow rate, a first relationship of the plurality of relationships including a first line indicative of the first pilot threshold with respect to the combustor air mass flow rate, a second relationship of the plurality of relationships including a second line indicative of the second pilot threshold with respect to the combustor air mass flow rate, and a third relationship of the plurality of relationships including a third line indicative of proportions of the total fuel mass flow rate supplied to the combustor as the pilot fuel mass flow rate as a function of combustor air mass flow rate corresponding to a steady state combustor air mass flow rate, wherein the controller is configured to access the map stored in the memory, and wherein the controller is further configured to, in response to the load change being a positive load change corresponding to a load acceptance, shift the proportion of the total fuel mass flow rate supplied to the combustor as the pilot fuel mass flow rate from an initial point on the third line to a new point within a range between the third line and the first line.

11. The controller according to claim 10, wherein the controller is configured to shift the proportion of the total fuel mass flow rate supplied to the combustor as the pilot mass flow rate from the new point to the third line upon completion of the load acceptance.

12. The controller according to claim 10, wherein the controller is further configured to, in response to the load change being a negative load change corresponding with a load rejection, shift the proportion of the total fuel mass flow rate supplied to the combustor as the pilot mass flow rate from the initial point on the third line to a new point within a range between the third line and the second line.

13. The controller according to claim 12, wherein the controller is configured to shift the proportion of the total fuel mass flow rate supplied to the combustor as the pilot mass flow rate from the new point to the third line upon completion of the load rejection.

14. A tangible non-transient computer-readable storage medium having recorded thereon instructions to be implemented by a controller for a gas turbine, the gas turbine comprising a compressor arranged to operate at a rotational speed, a combustor and a fuel supply comprising a first fuel supply and a second fuel supply, wherein the compressor is arranged to provide air to the combustor at a combustor air mass flow rate and wherein the fuel supply is arranged to supply fuel at a total fuel mass flow rate to the combustor, wherein the instructions when implemented by the controller cause the controller to perform the following:

responsive to a load change due to a transient of the gas turbine, control in a current time step the fuel supply to supply to the combustor a proportion of the total fuel mass flow rate as a pilot fuel mass flow rate via the first fuel supply based, at least in part, on a combustor air mass flow determined in a time step preceding the current time step, wherein the proportion of the total fuel mass flow rate supplied to the combustor as the pilot fuel mass flow rate via the first fuel supply is within a range between a first pilot threshold and a second pilot threshold, wherein the first pilot threshold corresponds with loss of a pilot flame of the combustor, wherein the second pilot threshold corresponds with overheating of a burner of the combustor, wherein the first pilot threshold is pre-determined for the gas turbine, and wherein the second pilot threshold is pre-determined for the gas turbine, wherein the tangible non-transient computer-readable storage medium stores a map of a plurality of relationships indicative of proportions of the total fuel mass flow rate supplied to the combustor as the pilot fuel mass flow rate as a function of combustor air mass flow rate, a first relationship of the plurality of relationships including a first line indicative of the first pilot threshold with respect to the combustor air mass flow rate, a second relationship of the plurality of relationships including a second line indicative of the second pilot threshold with respect to the combustor air mass flow rate, and a third relationship of the plurality of relationships including a third line indicative of proportions of the total fuel mass flow rate supplied to the combustor as the pilot fuel mass flow rate as a function of combustor air mass flow rate corresponding to a steady state combustor air mass flow rate, and wherein the tangible non-transient computer-readable storage medium further comprises stored thereon to be implemented by the controller to cause the controller to:

access the map stored on the tangible non-transient computer-readable storage medium;

in response to the load change being a positive load change corresponding to a load acceptance, shift the proportion of the total fuel mass flow rate supplied to the combustor as the pilot fuel mass flow rate from an initial point on the third line to a new point located within a range between the third line and the first line, and in response to the load change being a negative load change corresponding with a load rejection, shift the proportion of the total fuel mass flow rate supplied to the combustor as the pilot fuel mass flow rate from the initial point on the third line to a new point within a range between the third line and the second line.

* * * * *